United States Patent
Nakamura et al.

(10) Patent No.: US 10,749,209 B2
(45) Date of Patent: Aug. 18, 2020

(54) ELECTROLYTE, BATTERY, BATTERY PACK, ELECTRONIC APPARATUS, ELECTRIC VEHICLE, POWER STORAGE APPARATUS, AND POWER SYSTEM

(71) Applicant: MURATA MANUFACTURING CO., LTD., Kyoto (JP)

(72) Inventors: Azumi Nakamura, Kanagawa (JP); Tadahiko Kubota, Kanagawa (JP); Toru Odani, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 163 days.

(21) Appl. No.: 15/536,890

(22) PCT Filed: Jan. 22, 2016

(86) PCT No.: PCT/JP2016/000315
§ 371 (c)(1),
(2) Date: Jun. 16, 2017

(87) PCT Pub. No.: WO2016/136132
PCT Pub. Date: Sep. 1, 2016

(65) Prior Publication Data
US 2017/0358818 A1 Dec. 14, 2017

(30) Foreign Application Priority Data
Feb. 27, 2015 (JP) ................. 2015-037988

(51) Int. Cl.
*H01M 10/0565* (2010.01)
*H01M 10/0567* (2010.01)
(Continued)

(52) U.S. Cl.
CPC ......... *H01M 10/0565* (2013.01); *C01F 7/021* (2013.01); *H01M 2/16* (2013.01);
(Continued)

(58) Field of Classification Search
CPC ......... H01M 10/0565; H01M 10/0525; H01M 4/628; H01M 4/366; H01M 4/139;
(Continued)

(56) References Cited

U.S. PATENT DOCUMENTS

2005/0208380 A1  9/2005 Park et al.
2006/0188783 A1  8/2006 Choi et al.
(Continued)

FOREIGN PATENT DOCUMENTS

CN  1918731    2/2007
CN  103178296  6/2013
(Continued)

OTHER PUBLICATIONS

Official Action (no English translation available) for Chinese Patent Application No. 201680004266.0, dated Jan. 22, 2019, 8 pages.
(Continued)

*Primary Examiner* — Lisa S Park
(74) *Attorney, Agent, or Firm* — Sheridan Ross P.C.

(57) ABSTRACT

A battery includes: a positive electrode; a negative electrode; and an electrolyte. At least one of the electrolyte and the negative electrode contains an aluminum hydroxide, at least a part of a surface of the aluminum hydroxide being modified.

19 Claims, 8 Drawing Sheets

(51) Int. Cl.
| | |
|---|---|
| *H01M 2/16* | (2006.01) |
| *H01M 4/62* | (2006.01) |
| *H01M 4/131* | (2010.01) |
| *C01F 7/02* | (2006.01) |
| *H01M 4/36* | (2006.01) |
| *H01M 10/0525* | (2010.01) |
| *H01M 4/13* | (2010.01) |
| *H01M 4/139* | (2010.01) |
| *B60L 50/50* | (2019.01) |
| *G01N 25/48* | (2006.01) |

(52) U.S. Cl.
CPC ............. *H01M 4/13* (2013.01); *H01M 4/139* (2013.01); *H01M 4/366* (2013.01); *H01M 4/62* (2013.01); *H01M 4/628* (2013.01); *H01M 10/0525* (2013.01); *H01M 10/0567* (2013.01); *B60L 50/50* (2019.02); *C01F 7/02* (2013.01); *G01N 25/4866* (2013.01); *H01M 2/1686* (2013.01); *H01M 4/131* (2013.01); *H01M 2220/20* (2013.01); *H01M 2300/0085* (2013.01)

(58) Field of Classification Search
CPC ...... H01M 4/13; H01M 2/16; H01M 10/0567; H01M 4/62; H01M 2220/20; H01M 2/1686; H01M 2300/0085; H01M 4/131; C01F 7/021; C01F 7/02; B60L 50/50; G01N 25/4866
See application file for complete search history.

(56) References Cited

U.S. PATENT DOCUMENTS

| | | | | |
|---|---|---|---|---|
| 2010/0159314 | A1* | 6/2010 | Kim | H01M 2/1673 429/120 |
| 2013/0032752 | A1* | 2/2013 | Shiraki | C08L 91/06 252/74 |
| 2014/0287295 | A1* | 9/2014 | Honda | H01G 11/52 429/144 |
| 2015/0004499 | A1 | 1/2015 | Kitagawa et al. | |

FOREIGN PATENT DOCUMENTS

| | | |
|---|---|---|
| JP | H09-171813 A | 6/1997 |
| JP | H09-204930 A | 8/1997 |
| JP | 2006-526878 A | 11/2006 |
| JP | 2007-522619 A | 8/2007 |
| JP | 2012-38734 A | 2/2012 |
| JP | 2012-190569 A | 10/2012 |
| JP | 2013-30445 A | 2/2013 |
| WO | WO 2013/161452 A1 | 10/2013 |

OTHER PUBLICATIONS

International Search Report prepared by the Japan Patent Office dated Apr. 1, 2016, for International Application No. PCT/JP2016/000315.

* cited by examiner

ELECTROLYTE, BATTERY, BATTERY PACK, ELECTRONIC APPARATUS, ELECTRIC VEHICLE, POWER STORAGE APPARATUS, AND POWER SYSTEM

CROSS REFERENCE TO RELATED APPLICATIONS

This application is a national stage application under 35 U.S.C. 371 and claims the benefit of PCT Application No. PCT/JP2016/000315 having an international filing date of 22 Jan. 2016, which designated the United States, which PCT application claimed the benefit of Japanese Patent Application No. 2015-037988 filed 27 Feb. 2015, the disclosures of which are incorporated herein by reference in their entirety.

TECHNICAL FIELD

The present technology relates to an electrolyte, a battery, a battery pack, an electronic apparatus, an electric vehicle, a power storage apparatus, and a power system.

BACKGROUND ART

In recent years, an electronic apparatus typified by a mobile phone or portable information terminal equipment is widely used, and the size reduction, reduction in weight, and prolonged service life of the electronic apparatus are strongly desired. Along with this, as a power source, a battery, particularly, a small-sized and light secondary battery that is capable of achieving a high energy density has been developed.

This secondary battery is recently considered to be applied not only to the above-mentioned electronic apparatus but also to various applications typified by an electric tool such as an electric drill, an electric vehicle such as an electric automobile, and a power storage system such as a power server for a house. As power sources of these apparatuses, a secondary battery having high output and a high capacity has been developed.

Technologies relating to a secondary battery are disclosed in the following Patent Literature 1 to 2. For example, in the secondary battery described in Patent Literature 1, active alumina particles containing an aluminum hydroxide are contained in the battery in order to achieve excellent cycle characteristics. In the secondary battery described in Patent Literature 2, an aluminum hydroxide is disposed in a battery container in order to ensure safety.

CITATION LIST

Patent Literature

Patent Literature 1: Japanese Patent Application Laid-open No. 2010-212046
Patent Literature 2: Japanese Patent No. 5378305

DISCLOSURE OF INVENTION

Technical Problem

It is desirable to improve cycle characteristics of batteries. Therefore, it is an object of the present technology to provide an electrolyte, a battery, a battery pack, an electronic apparatus, an electric vehicle, a power storage apparatus, and a power system that can improve cycle characteristics.

Solution to Problem

In order to solve the above-mentioned problems, the present technology is an electrolyte containing an aluminum hydroxide, at least a part of a surface of the aluminum hydroxide being modified.

The present technology includes a positive electrode, a negative electrode, and an electrolyte, in which at least one of the electrolyte and the negative electrode contains an aluminum hydroxide, at least a part of a surface of the aluminum hydroxide being modified.

A battery pack, an electronic apparatus, an electric vehicle, a power storage apparatus, and a power system according to the present technology include the above-mentioned battery.

Advantageous Effects of Invention

In accordance with the electrolyte according to the present technology, because it contains an aluminum hydroxide at least a part of a surface of the aluminum hydroxide being modified, it is possible to improve cycle characteristics. In accordance with the battery according to the present technology, because at least one of the electrolyte and the negative electrode contains an aluminum hydroxide, at least a part of a surface of the aluminum hydroxide being modified, it is possible to improve cycle characteristics. The similar effects can be obtained in the battery pack, the electronic apparatus, the electric vehicle, the power storage apparatus, and the power system according to the present technology.

MODE(S) FOR CARRYING OUT THE INVENTION

Overview of Present Technology

Figure 1:
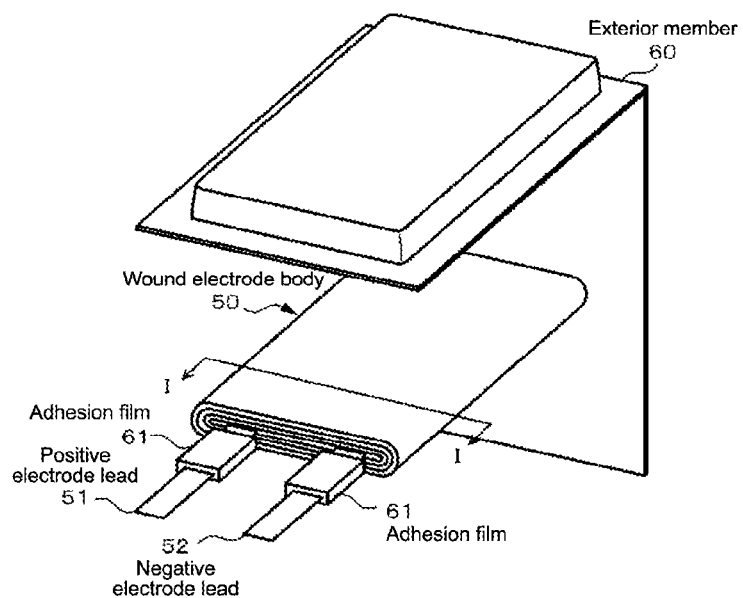
FIG. 1 is an exploded perspective view showing a configuration of a laminated film type non-aqueous electrolyte battery according to an embodiment of the present technology.

First, the overview of the present technology will be described to facilitate understanding of the present technology. Patent Literature 1 (Japanese Patent Application Laid-open No. 2010-212046) describes that it is effective to use an electrolyte solution that contains activated alumina containing an aluminum hydroxide and has a specific surface area of 50 to 1000 m$^2$/g, for improving cycle characteristics and safety. The active alumina is obtained by applying heat treatment to an aluminum hydroxide at 230° C. or 240° C.

However, water and hydroxyl groups present in a surface of the aluminum hydroxide react in the battery (hereinafter, referred to as "side reaction"), thereby generating irreversible capacity and deteriorating charge and discharge efficiency. Further, because the specific surface area is large, adverse effects such as an increase in the amount of side reaction and an increase in inside adsorbed water occur. Meanwhile, by applying heat treatment to the aluminum hydroxide at 230° C. or 240° C., the dehydration temperature, i.e., the endothermic reaction temperature rises, so that the fire-retardant effect in the temperature range required for the battery reaction is reduced.

In the technology of Patent Literature 2 (Japanese Patent No. 5378305), there is a heat-absorbing layer containing a metal hydroxide between a positive electrode and a separator. However, surface modification of the metal hydroxide is not mentioned. Further, there is no example evaluating battery characteristics, and the influence of side reaction is not mentioned.

For example, in order to improve at least one of safety, cycle characteristics, oxidation resistance, and float of the battery, an electrolyte containing an oxide or hydroxide of aluminum such as alumina and aluminum hydroxide is used. In the case where the electrolyte is used, it is desired to further improve the cycle retention rate. In the present technology, by modifying the surface of an aluminum hydroxide, it is possible to improve the charge and discharge efficiency and the cycle retention rate. Alternatively, by reducing the amount of water in the electrolyte solution without significantly raising the endothermic temperature of an aluminum hydroxide, it is possible to improve the cycle retention rate similarly. Alternatively, it is effective in suppressing gas generation.

Hereinafter, embodiments of the present technology will be described with reference to the drawings. Note that descriptions will be made in the following order.
1. First Embodiment (example of laminated film type battery)
2. Second Embodiment (example of cylindrical battery)
3. Third Embodiment (example of battery pack)
4. Fourth Embodiment (example of power storage apparatus)
5. Fifth Embodiment (example of power storage system and the like)
8. Other Embodiments It should be noted that embodiments and the like described below are favorable specific examples of the present technology, and the content of the present technology is not limited to these embodiments and the like. The effects described herein are merely examples and not necessarily limitative, and do not exclude that there are effects different from the exemplified effects.

1. First Embodiment (1-1) Configuration Example of Laminated Film Type Battery In a first embodiment of the present technology, a laminated film type non-aqueous electrolyte secondary battery (hereinafter, referred to as "non-aqueous electrolyte battery" or simply "battery") will be described as an example with reference to FIG. 1 and FIG. 2.

In this non-aqueous electrolyte battery, a wound electrode body 50 to which a positive electrode lead 51 and a negative electrode lead 52 are attached is housed inside a film-like exterior member 60.

The positive electrode lead 51 and the negative electrode lead 52 are led out from the inside of the exterior member 60 to the outside in, for example, the same direction. Each of the positive electrode lead 51 and the negative electrode lead 52 is formed of a metal material such as aluminum, copper, nickel, and stainless steel, and has a thin plate shape or mesh shape.

The exterior member 60 is formed of, for example, a laminated film in which a resin layer is formed on both surfaces of a metal layer. In the laminated film, an outer resin layer is formed on a surface of the metal layer exposed to the outside of the battery, and an inner resin layer is formed on the inner surface of the battery facing a power generation element such as the wound electrode body 50.

The metal layer plays a role of protecting the battery by preventing ingress of water, oxygen, and light, and aluminum (Al) is often used from the viewpoint of lightness, elongation property, price, and ease of processing. A resin material such as nylon and polyethylene terephthalate (PET) is used as the outer resin layer, which has aesthetic appearance, toughness, flexibility, and the like. Because the inner resin layer melts by heat or ultrasonic waves and is a portion that fuses to each other, polyolefin resin is suitable and non-oriented polypropylene (CPP) is used. An adhesive layer may be provided between the metal layer and the outer resin layer and the inner resin layer as necessary.

The exterior member 60 is provided with a recessed portion for housing the wound electrode body 50, which is formed from the inner resin layer side toward the outer resin layer side by deep drawing, for example, and the inner resin layer is disposed so as to face the wound electrode body 50. The facing inner resin layers of the exterior member 60 are brought into close contact with each other at the outer edge portion of the recessed portion by fusion or the like. Between the inner resin layer of the exterior member 60 and the positive electrode lead 51 and the negative electrode lead 52, an adhesion film 61 for improving the adhesiveness thereof is disposed. The adhesion film 61 is formed of a resin material having high adhesiveness to a metal material, and is formed of polyolefin resin such as polyethylene, polypropylene, modified polyethylene, and modified polypropylene.

Note that the exterior member 60 may be formed of a laminated film having another structure, a single polymer film such as polypropylene, or a single metal film, instead of the laminated film including the metal layer and the double-sided resin layer described above.

Figure 2:
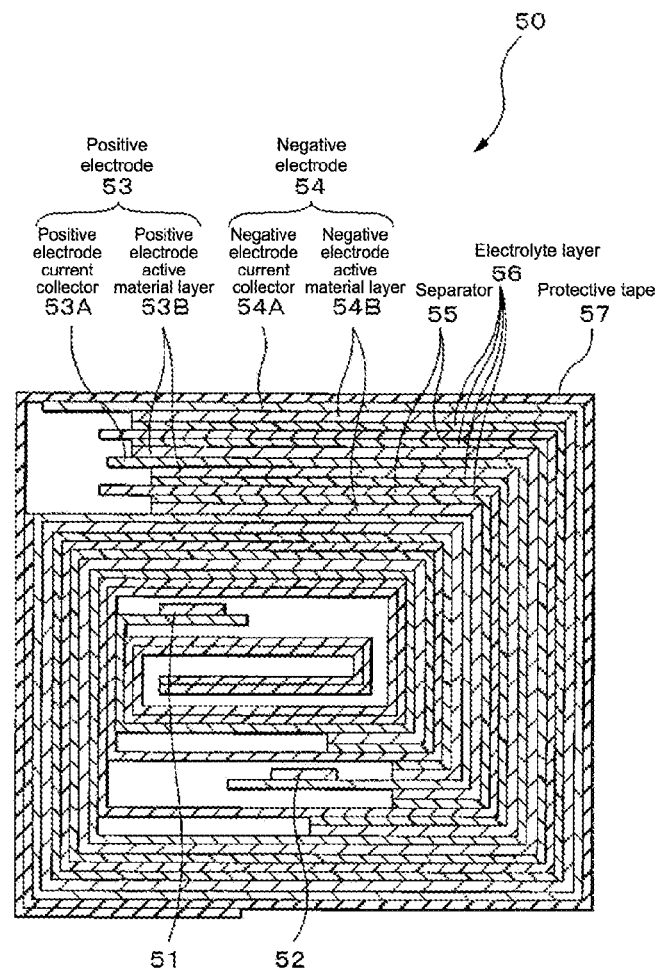
FIG. 2 is a cross-sectional view showing a cross-sectional configuration taken along the line I-I of a wound electrode body shown in FIG. 1.

FIG. 2 shows a cross-sectional configuration taken along the line I-I of the wound electrode body 50 shown in FIG. 1. As shown in FIG. 2, the wound electrode body 50 is obtained by laminating and winding a strip-shaped positive electrode 53 and a strip-shaped negative electrode 54 via a strip-shaped separator 55 and an electrolyte layer 56, and the outermost peripheral portion is covered with a protective tape 57 as necessary.

(Positive Electrode)

The positive electrode 53 has a structure in which a positive electrode active material layer 53B is formed on one surface or both surfaces of a positive electrode current collector 53A. As the positive electrode current collector 53A, a metal foil such as an aluminum foil, a nickel (Ni) foil, and a stainless steel (SUS) foil can be used.

The positive electrode active material layer 53B is configured to contain, for example, a positive electrode active material capable of absorbing and releasing lithium, a conductive agent, and a binding agent.

As the positive electrode active material, for example, a lithium-containing compound is favorable. This is because a high energy density can be achieved. Examples of this lithium-containing compound include a composite oxide containing lithium and a transition metal element, and a phosphoric acid compound containing lithium and a transition metal element. Among them, those containing at least one element selected from the group consisting of cobalt (Co), nickel, manganese (Mn), and iron (Fe) as a transition metal element are favorable. This is because higher voltage can be obtained.

As the positive electrode active material, for example, a lithium-containing compound represented by a general formula of $Li_xM_1O_2$ or $Li_yM_2PO_4$ can be used. In the formula, M1 and M2 each represent one or more transition metal elements. Values of x and y vary depending on the charge and discharge state of the battery, and usually, the following relationships, $0.05 \leq x \leq 1.10$ and $0.05 \leq y \leq 1.10$, are satisfied. Examples of the composite oxide containing lithium and a transition metal element include a lithium cobalt composite oxide ($Li_xCoO_2$), a lithium nickel composite oxide ($Li_xNiO_2$), a lithium nickel cobalt composite oxide ($Li_xNi_{1-z}Co_zO_2$ ($0<z<1$), a lithium nickel cobalt manganese composite oxide ($Li_xNi_{(1-v-w)}Co_vMn_wO_2$ ($0<v+w<1$, $v>0$, $w>0$)), and a lithium manganese complex oxide ($LiMn_2O_4$) or a lithium manganese nickel composite oxide ($LiMn_{2-t}Ni_tO_4$ ($0<t<2$)) having a spinel type structure. Among them, a complex oxide containing cobalt is favorable. This is because excellent cycle characteristics as well as a high capacity can be achieved. Further, examples of the phosphoric acid compound containing lithium and a transition metal element include a lithium iron phosphate compound ($LiFePO_4$) and a lithium iron manganese phosphate compound ($LiFe_{1-u}Mn_uPO_4$ ($0<u<1$)).

Further, a solid solution in which a part of the transition metal elements is substituted by another element can be used. Examples of the solid solution include a nickel cobalt composite lithium oxide ($LiNi_{0.5}Co_{0.5}O_2$, $LiNi_{0.8}Co_{0.2}O_2$, etc.). These lithium composite oxides are capable of generating high voltage and have an excellent energy density.

Further, composite particles in which the surface of particle formed of any one of the above-mentioned lithium-containing compounds is coated with fine particles formed of any one of other lithium-containing compounds can be used from the viewpoint that higher electrode packing properties and cycle characteristics can be obtained.

The positive electrode active material may be other than the above, and examples thereof include oxides such as vanadium oxide ($V_2O_5$), titanium dioxide ($TiO_2$), and manganese dioxide ($MnO_2$), disulfides such as iron disulfide ($FeS_2$), titanium disulfide ($TiS_2$), and molybdenum disulfide ($MoS_2$), lithium-free chalcogenides such as niobium diselenide ($NbSe_2$) (particularly, layered compounds and spinel type compounds), sulfur, and conductive polymers such as polyaniline, polythiophene, polyacetylene, and polypyrrole. Further, two or more kinds of the above-mentioned series of positive electrode active materials may be mixed in arbitrary combination.

As the conductive agent, for example, a carbon material such as carbon black and graphite is used. As the binding agent, at least one selected from resin materials such as polyvinylidene fluoride (PVdF), polytetrafluoroethylene (PTFE), polyacrylonitrile (PAN), styrene butadiene rubber (SBR), and carboxymethyl cellulose (CMC), and copolymers that include these resin materials as main components, is used.

The positive electrode 53 has the positive electrode lead 51 connected to one end of the positive electrode current collector 53A by spot welding or ultrasonic welding. Examples of the material of the positive electrode lead 51 include a metal foil such as aluminum and nickel.

(Negative Electrode)

The negative electrode 54 has a structure in which a negative electrode active material layer 54B is formed on one surface or both surfaces of a negative electrode current collector 54A. The negative electrode current collector 54A is formed of, for example, a metal foil such as a copper foil.

The negative electrode active material layer 54B is configured to contain one or more of negative electrode active materials capable of absorbing and releasing lithium ions, and may be configured to contain, as necessary, a different material such as a binding agent and a conductive agent similar to those of the positive electrode active material layer 53B.

Note that in this non-aqueous electrolyte battery, it is favorable that the electrochemical equivalent of the negative electrode 54 or the negative electrode active material is larger than that of the positive electrode 53, and theoretically, lithium metal does not precipitate on the negative electrode 54 during charging.

In addition, this non-aqueous electrolyte battery is designed so that open circuit voltage (i.e., battery voltage) in a fully charged state falls within a range of, for example, not less than 2.80 V and not more than 6.00 V. In particular, in the case where a material to be a lithium alloy near 0 V with respect to Li/Li+ or a material absorbing lithium is used as the negative electrode active material, it is designed so that the open circuit voltage in the fully charged state falls within a range of, for example, not less than 4.20 V and not more than 6.00 V. In this case, it is favorable that the open circuit voltage in the fully charged state is set to not less than 4.25 V and not more than 6.00 V. In the case where the open circuit voltage at the time of complete charge is set to not less than 4.25 V, because the amount of lithium released per unit mass increases even with the same positive electrode active material as compared with a battery with the open circuit voltage of 4.20 V, the amounts of the positive electrode active material and the negative electrode active material are adjusted depending thereon. With this, a high energy density can be achieved.

Examples of the negative electrode active materials include non-graphitizable carbon, easily graphitizable carbon, graphite, pyrolytic carbons, cokes, glassy carbons, baked organic polymer compounds, carbon fiber, activated carbon and other carbon materials. Examples of cokes in these materials include pitch coke, needle coke, and petroleum coke. The baked organic polymer compounds are materials in which a polymer material such as phenolic resin and furan resin is baked at appropriate temperatures and carbonized. Some of the baked organic polymer compounds can also be classified as non-graphitizable carbon, or easily graphitizable carbon. These carbon materials are favorable because possible changes in crystal structure of such materials in charging and discharging are very small, and high charge-discharge capacity and good cycle characteristics can be achieved. In particular, graphite is favorable because of its large electrochemical equivalent and capability of providing high energy density. Further, non-graphitizable carbon is favorable because of its capability of providing excellent cycle characteristics. Further, the carbon materials that show low charge-discharge potential, specifically, those that show charge-discharge potential close to that shown by lithium metal is favorable because such materials make it easier to realize high energy density of the battery.

Further, examples of another negative electrode active material capable of increasing the capacity include a material that contains at least one of a metal element and a metalloid element as a constituent element (e.g., a single substance, an alloy, a compound, and a mixture). This is because high energy density can be achieved when this kind of material is used. In particular, it is more favorable to use such a material together with a carbon material because high energy density and also excellent cycle characteristics can be achieved. Note that the term "alloy" encompasses alloys containing two or more kinds of metal elements, and also alloys containing one or more kinds of metal elements and one or more kinds of metalloid elements. Further, these alloys may also contain non-metal elements. Tissues of these alloys include a solid solution, a eutectic crystal (eutectic mixture), or an intermetallic compound, and two or more thereof may coexist.

Examples of such a negative electrode active material include metal elements and metalloid elements that are capable of forming an alloy with lithium. Specific examples of the metal elements and metalloid elements include magnesium (Mg), boron (B), aluminum, titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

Favorably, the negative electrode active material may be one that contains a metal element or a metalloid element belonging to group 4B in the short form periodic table as a constituent element. One that contains at least one of silicon and tin as a constituent element is more favorable. This is because silicon and tin have high capability for absorbing and releasing lithium and high energy density can be achieved. Examples of such a negative electrode active material include a single substance, an alloy, and a compound of silicon, a single substance, an alloy, and a compound of tin, and a material that includes one or more of these forms at least in a portion thereof.

Examples of alloys of silicon include an alloy containing, as its second constituent element other than silicon, at least one kind of element selected from the group consisting of tin, nickel, copper (Cu), iron, cobalt (Co), manganese, zinc (Zn), indium, silver, titanium, germanium, bismuth, antimony (Sb), and chromium (Cr). Examples of alloys of tin include an alloy containing, as its second constituent element other than tin, at least one kind of element selected from the group consisting of silicon, nickel, copper, iron, cobalt, manganese, zinc, indium, silver, titanium, germanium, bismuth, antimony, and chromium.

Examples of compounds of tin or compounds of silicon include a compound that contains oxygen (O) or carbon (C). Such compounds may also contain, in addition to tin or silicon, any of the second constituent elements described above.

Among these materials, a SnCoC-containing material that contains cobalt, tin, and carbon as constituent elements, in which the content of carbon is not less than 9.9% by mass and not more than 29.7% by mass and the proportion of cobalt of the sum of tin and cobalt is not less than 30% by mass and not more than 70% by mass, is favorable as the Sn-based negative electrode active material. This is because high energy density and excellent cycle characteristics can be achieved in such a composition range.

The SnCoC-containing material may further contain other constituent elements as necessary. As these other constituent elements, for example, silicon, iron, nickel, chromium, indium, niobium (Nb), germanium, titanium, molybdenum (Mo), aluminum, phosphorus (P), gallium, and bismuth are favorable, and two or more thereof may be contained. This is because capacitance characteristics or cycle characteristics can be further improved.

Note that it is favorable that the SnCoC-containing material has a phase containing tin, cobalt, and carbon, in which the phase has a low crystallized or amorphous structure. Further, in the SnCoC-containing material, it is favorable that at least a part of carbon as the constituent element is bound to a metal element or a metalloid element as the other constituent element. This is because lowering of cycle characteristics may be due to aggregation or crystallization of tin or the like, and carbon is bound to other elements, making it possible to suppress such aggregation or crystallization.

Examples of measurement methods for examining the binding state of elements include X-ray photoelectron spectroscopy (XPS). In this XPS, so far as graphite is concerned, a peak of the is orbit of carbon (C1s) appears at 284.5 eV in an energy-calibrated apparatus such that a peak of the 4f orbit of a gold atom (Au4f) is obtained at 84.0 eV. Also, so far as surface-contaminated carbon is concerned, it appears at 284.8 eV. Meanwhile, when a charge density of the carbon element is high, for example, when carbon is bound to a metal element or a metalloid element, the peak of C1s appears in a lower region than 284.5 eV. That is, when a peak of a combined wave of C1s obtained on the SnCoC-containing material appears in a lower region than 284.5 eV, at least a part of carbon contained in the SnCoC-containing material is bound to a metal element or a metalloid element as other constituent element.

Note that in the XPS measurement, for example, the peak of C1s is used for correcting the energy axis of a spectrum. In most cases, because there is some surface-contaminated carbon present in the surface, the peak of C1s of the surface-contaminated carbon can be fixed at 284.8 eV, and this peak can be used as an energy reference. In the XPS measurement, because a waveform of the peak of C1s can be obtained as a form that includes both the peak of the surface-contaminated carbon and the peak of carbon from the SnCoC-containing material, for example, through an analysis using commercial software programs, the peak of the surface-contaminated carbon and the peak of the carbon from the SnCoC-containing material can be separated from each other. In the analysis of the waveform, the position of a main peak existing closer to the lowest binding energy is used as an energy reference (284.8 eV).

Examples of other negative electrode active materials include metal oxides and polymer compounds, each of which is capable of absorbing and releasing lithium. Examples of the metal oxides include, lithium titanium oxide containing lithium and titanium such as lithium titanate ($Li_4Ti_5O_{12}$), iron oxide, ruthenium oxide, and molybdenum oxide. Examples of the polymer compounds include polyacetylene, polyaniline, and polypyrrole.

(Separator)

The separator 55 is a porous film formed of an insulating film having a predetermined ion permeability and mechanical strength.

The separator 55 is, for example, a porous film formed of resin, and is obtained by molding a resin material by a stretch opening method, a phase separation method, or the like. For example, in the stretch opening method, first, a molten polymer is extruded from a T die or a circular die and then subjected to heat treatment to form a crystalline structure with high regularity. After that, it is subjected to low-temperature stretching and high-temperature stretching to peel off the crystal interface to form a spacing portion between lamellae, thereby forming a porous structure. In the phase separation method, a homogeneous solution prepared by mixing a polymer and a solvent at a high temperature is formed into a film by a T-die method, an inflation method, or the like, and then the solvent is extracted with another volatile solvent, thereby obtaining a porous film formed of resin. Note that the method of producing the porous film formed of resin is not limited thereto. As the resin material forming the separator 55, for example, polyolefin resin such as polypropylene and polyethylene, acrylic resin, styrene resin, polyester resin, nylon resin, or the like is favorably used. In particular, low density polyethylene, high density polyethylene, linear polyethylene, low molecular weight wax thereof, and polyolefin resin such as polypropylene are suitably used because they have a suitable melting temperature and are easy to obtain. Further, a structure obtained by laminating two or more of the porous films or a porous film formed by melt-kneading two or more resin materials. Those containing a porous film formed of polyolefin resin have excellent separability between the positive electrode 53 and the negative electrode 54, and can further suppress the reduction in internal short circuit.

The separator 55 may be a non-woven fabric. The non-woven fabric is a structure produced by mechanically, chemically, or with a solvent, or a combination thereof, joining, entangling, or joining and entangling fibers, without weaving or knitting the fibers. Most materials that can be processed into fibers can be used as the raw material of the nonwoven fabric, and by adjusting the shape such as a fiber length and a thickness, it is possible to cause the materials to have the function depending on the purpose and use. The method of producing the non-woven fabric typically includes two stages of a step of forming an accumulation layer of fibers called a fleece and a bonding step of bonding fibers of the fleece. At each stage, various production methods can be used, and the production methods are selected depending on the raw material, purpose, and use of the non-woven fabric. For example, in the step of forming a fleece, a dry method, a wet method, a spunbond method, a melt blow method, and the like can be used. In the bonding step of bonding fibers of the fleece, a thermal bond method, a chemical bond method, a needle punching method, a spunlace method (water flow entangling method), a stitch bond method, a steam jet method, and the like can be used.

Examples of the non-woven fabric include a permeable film (polyethylene terephthalate non-woven fabric) using polyethylene terephthalate fiber. Note that the air permeable film is a film having air permeability. Other examples of the non-woven fabric include those using aramid fiber, glass fiber, cellulose fiber, polyolefin fiber, nylon fiber, or the like. The non-woven fabric may be one using two or more kinds of fibers.

(Electrolyte Layer)

The electrolyte layer 56 includes a matrix polymer compound, a non-aqueous electrolyte solution, and a surface-modified aluminum hydroxide according to the present technology to which surface processing is applied. The electrolyte layer 56 is, for example, a non-aqueous electrolyte solution held by a matrix polymer compound, and a layer formed of a so-called gel electrolyte. Note that the surface-modified aluminum hydroxide is contained in the electrolyte layer 56, and may be contained in at least one of the negative electrode active material layer 54B, the positive electrode active material layer 53B, and the separator 55. The surface-modified aluminum hydroxide does not necessarily need be contained in the electrolyte layer 56, and may be contained in at least one of the negative electrode active material layer 54B, the positive electrode active material layer 53B, and the separator 55. Further, instead of the electrolyte layer 56, a non-aqueous electrolyte solution that is a liquid electrolyte may be used. In this case, the wound electrode body 50 is impregnated with a non-aqueous electrolyte solution that is a liquid electrolyte filled in the exterior member 60.

(Matrix Polymer Compound)

As the matrix polymer compound (resin) for holding the electrolyte solution, those having a property compatible with the solvent, or the like can be used. Examples of such matrix polymer compounds include fluorine-containing resins such as polyvinylidene fluoride and polytetrafluoroethylene, fluorine-containing rubbers such as vinylidene fluoride-tetrafluoroethylene copolymer and ethylene-tetrafluoroethylene copolymer, styrene-butadiene copolymer and hydride thereof, acrylonitrile-butadiene copolymer and hydride thereof, acrylonitrile-butadiene-styrene copolymer and hydride thereof, rubbers such as methacrylic acid ester-acrylic acid ester copolymer, styrene-acrylate copolymer, acrylonitrile-acrylate copolymer, ethylene propylene rubber, polyvinyl alcohol, and polyvinyl acetate, cellulose derivatives such as ethylcellulose, methylcellulose, hydroxyethyl cellulose, and carboxymethyl cellulose, resins having at least one of a melting point and a glass transition temperature that is equal to or higher than 180° C. such as polyphenylene ether, polysulfone, polyethersulfone, polyphenylene sulfide, polyetherimide, polyimide, polyamide (particularly, aramid), polyamide imide, polyacrylonitrile, polyvinyl alcohol, polyether, acrylic acid resin, and polyester, and polyethylene glycol.

(Non-Aqueous Electrolyte Solution)

The non-aqueous electrolyte solution contains an electrolyte salt and a non-aqueous solvent that dissolves the electrolyte salt.

(Electrolyte Salt)

An electrolyte salt contains one or more light metal compounds such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Among them, at least one of the group consisting of lithium hexafluorophosphate, lithium tetrafluoroborate, lithium perchlorate, and lithium hexafluoroarsenate is favorable, and lithium hexafluorophosphate is more favorable.

(Non-Aqueous Solvent)

Examples of a non-aqueous solvent include a lactone-based solvent such as γ-butyrolactone, γ-valerolactone, δ-valerolactone, and ε-caprolactone, ethylene carbonate, propylene carbonate, butylene carbonate, vinylene carbonate, dimethyl carbonate, carbonic ester type solvents such as ethyl methyl carbonate and diethyl carbonate, 1,2-dimethoxyethane, 1-ethoxy-2-methoxyethane, 1,2-diethoxyethane, ether solvents such as tetrahydrofuran and 2-methyltetrahydrofuran, nitrile solvents such as acetonitrile, non-aqueous solvents such as a sulfolan type solvent, phosphoric acids, a phosphate ester solvent, and pyrrolidones. Any one of these solvents may be used alone, or two or more of them may be mixed and used.

(Surface-Modified Aluminum Hydroxide)

A surface-modified aluminum hydroxide is an aluminum hydroxide, at least a part of a surface of the aluminum hydroxide being modified. Cycle characteristics can be improved by suppressing side reactions by surface modification. The surface-modified aluminum hydroxide is contained in the electrolyte layer 56 in the form of particles, for example. The surface modification includes, for example, a state where at least one of a surface processing agent and those derived from the surface processing agent (not the surface processing agent itself but the one that reacts by heat treatment and is attached to the surface) is physically or chemically bonding to the surface of an aluminum hydroxide, thereby changing the surface. For example, the surface-modified aluminum hydroxide is one in which a coating portion containing an organic polymer compound or an inorganic compound different from an aluminum hydroxide is formed on at least a part of the surface.

As the surface processing agent, those generally used for surface processing of inorganic particles such as vinyl-based silane coupling agents such as vinyltrimethoxysilane and vinyltriethoxysilane, epoxy-based silane coupling agents such as 3-glycidoxypropyltriethoxysilane, Styryl-based silane coupling agents such as p-styryltrimethoxysilane, an isocyanate-based silane coupling agent, a silane coupling agent typified by a mercapto-based silane coupling agent and the like, alkoxytitanium ester having a Ti—O—C type bond, titanium chelate, titanate-based coupling agents typified by titanium acylate, aluminate-based coupling agents typified by triisopropoxyaluminum having an Al—O—C bond, and higher fatty acid surface processing agents typified by stearic acid, are used. Note that the surface processing agent is not limited to the above-mentioned ones.

More specific examples of the surface-modified aluminum hydroxide include BE033T (surface processing: titanate processing, manufactured by Nippon Light Metal Co., Ltd.), BE03SS (surface processing: stearic acid processing, manufactured by Nippon Light Metal Co., Ltd.), BE033S™ (surface processing: methacryloxylan processing, manufactured by Nippon Light Metal Co., Ltd.), BE033STA (surface processing: aminosilane processing, manufactured by Nippon Light Metal Co., Ltd.), and BE033STE (surface processing: epoxy silane processing, manufactured by Nippon Light Metal Co., Ltd.), and BE033STV (surface processing: vinyl silane processing, manufactured by Nippon Light Metal Co., Ltd.).

The surface-modified aluminum hydroxide may be, for example, one having a maximum endothermic peak temperature in the range of not less than 270° C. and not more than 360° C. according to differential scanning calorimetry (DSC). In the case where differential scanning calorimetry of the surface-modified aluminum hydroxide is performed, two endothermic peaks are observed during temperature rise, and the maximum endothermic peak temperature is, for example, in the range of not less than 270° C. and not more than 360° C. Meanwhile, in the case of performing differential scanning calorimetry of an aluminum hydroxide whose surface is not processed, only one endothermic peak is observed during temperature rise. Although the details of such endothermic peaks observed in the surface-modified aluminum hydroxide are not clear, this is considered to be due to the surface modification of an aluminum hydroxide.

(Particle Diameter)

The particle diameter of the surface-modified aluminum hydroxide is favorably, for example, not less than 1 nm and not more than 5 μm, and more favorably not less than 1 nm and not more than 2 μm. Note that the particle diameter is a particle size (D50) of 50% of the cumulative value of the volume-based particle size distribution obtained by a laser diffraction method.

(Additive Amount of Surface-Modified Aluminum Hydroxide)

The additive amount of the surface-modified aluminum hydroxide is favorably not less than 1% by mass, and more favorably not less than 5% by mass in terms of mass percentage with respect to the electrolyte. In the case where the upper limit is specified, it is favorably not less than 1% by mass and not more than 20% by mass, more favorably not less than 5% by mass and not more than 20% by mass, and particularly favorably not less than 5% by mass and not more than 10% by mass.

(Specific Surface Area)

The specific surface area of the surface-modified aluminum hydroxide is typically, for example, not less than 0.5 $m^2/g$ and not more than 50 $m^2/g$. The specific surface area of the surface-modified aluminum hydroxide can be measured by the BET method (Brunauer-Emmett-Teller method).

(1-2) Example of Method of Producing Non-Aqueous Electrolyte Battery

This non-aqueous electrolyte battery can be produced, for example, as follows.

(Method of Producing Positive Electrode)

A positive electrode mixture is prepared by mixing a positive electrode active material, a conductive agent, and a binding agent, and this positive electrode mixture is dispersed in a solvent such as N-methyl-2-pyrrolidone to prepare a paste-like positive electrode mixture slurry. Next, this positive electrode mixture slurry is applied to the positive electrode current collector 53A, and the solvent is dried and compression-molded by a roll press machine or the like to form the positive electrode active material layer 53B, thereby preparing the positive electrode 53.

(Method of Producing Negative Electrode)

A negative electrode mixture is prepared by mixing a negative electrode active material and a binding agent, and this negative electrode mixture is dispersed in a solvent such as N-methyl-2-pyrrolidone to prepare a paste-like negative electrode mixture slurry. Next, this negative electrode mixture slurry is applied to the negative electrode current collector 54A, and the solvent is dried and compression-molded by a roll press machine or the like to form the negative electrode active material layer 54B, thereby preparing the negative electrode 54.

(Preparation of Non-Aqueous Electrolyte Solution)

The non-aqueous electrolyte solution is prepared by dissolving an electrolyte salt in a non-aqueous solvent.

(Solution Application)

An applying solution containing a non-aqueous electrolyte solution, a matrix polymer compound, the surface-modified aluminum hydroxide, and a diluent solvent (dimethyl carbonate or the like) is applied to both main surfaces of each of the positive electrode 53 and the negative electrode 54, and then, the diluent solvent is volatilized to form the electrolyte layer 56.

Note that the surface-modified aluminum hydroxide only needs to be contained in at least a part of the electrolyte layer 56 provided in the positive electrode 53 or the negative electrode 54. For example, the surface-modified aluminum hydroxide may be contained only in the electrolyte layer 56 on at least one main surface of the positive electrode 53. In this case, the electrolyte layer 56 does not necessary need to be formed on the negative electrode side. Meanwhile, for example, the surface-modified aluminum hydroxide may be contained only in the electrolyte layer 56 on at least one main surface of the negative electrode 54. In this case, the electrolyte layer 56 does not need to be formed on the positive electrode side.

(Assembly of Non-Aqueous Electrolyte Battery)

Next, the positive electrode lead 51 is attached to an end portion of the positive electrode current collector 53A by welding, and the negative electrode lead 52 is attached to an end portion of the negative electrode current collector 54A by welding.

Next, after the positive electrode 53 on which the electrolyte layer 56 is formed and the negative electrode 54 on which the electrolyte layer 56 is formed are laminated via the separator 55 to form a laminated body, this laminated body is wound in the longitudinal direction thereof, and the protective tape 57 is adhered to the outermost peripheral portion to form the wound electrode body 50.

Finally, for example, the wound electrode body 50 is sandwiched between the exterior members 60, and the outer edge portions of the exterior members 60 are brought into close contact with each other by thermal fusion or the like and sealed. At that time, the adhesion film 61 is inserted between the positive electrode lead 51 and the negative electrode lead 52 and the exterior member 60. In this way, the non-aqueous electrolyte battery shown in FIG. 1 and FIG. 2 is completed.

(Effects)

In the non-aqueous electrolyte battery according to the first embodiment of the present technology, charging and discharging efficiency and the cycle retention rate can be improved by adding an aluminum hydroxide on which surface processing is performed to the inside of the battery. Alternatively, by reducing the amount of water in the electrolyte solution without significantly increasing the endothermic temperature of an aluminum hydroxide, the cycle retention rate can be similarly improved. Alternatively, it is also possible to suppress gas generation.

2. Second Embodiment (2-1) Configuration of Example of Cylindrical Non-Aqueous Electrolyte Battery In a second embodiment of the present technology, a cylindrical non-aqueous electrolyte battery will be described with reference to a cross-sectional view of FIG. 3.

The cylindrical non-aqueous electrolyte battery includes, in a substantially hollow cylindrical battery can 81, a liquid non-aqueous electrolyte (hereinafter, referred to as "non-aqueous electrolyte solution" as appropriate) (not shown), and a wound electrode body 90 in which a strip-shaped positive electrode 91 and a strip-shaped negative electrode 92 are wound via a separator 93.

For example, one end portion of the battery can 81 is closed and the other end portion is opened. A pair of insulating plates 82a and 82b is disposed inside the battery can 81 vertically to the winding peripheral surface so as to sandwich the wound electrode body 90.

Examples of the material of the battery can 81 include iron, nickel, stainless steel, aluminum, and titanium. The battery can 81 may be plated with, for example, nickel, in order to prevent electrochemical corrosion due to a non-aqueous electrolyte caused by charge and discharge of the non-aqueous electrolyte battery. At the open end portion of the battery can 81, a battery lid 83 that is a positive electrode lead plate, and a safety valve mechanism and a heat sensitive resistance element (PTC element: Positive Temperature Coefficient) 87 provided inside this battery lid 83 are attached by being caulked via a gasket 88 for insulating sealing.

The battery lid 83 is formed of a material similar to that of the battery can 81, for example, and has an opening portion for discharging gas generated inside the battery. In the safety valve mechanism, a safety valve 84, a disc holder 85, and the shutoff disk 86 are stacked in order. A projecting portion 84a of the safety valve 84 is connected to a positive electrode lead 95 led out from the wound electrode body 90 via a sub-disc 89 placed so as to cover a hole portion 86a provided at the center portion of the shutoff disc 86. By connecting the safety valve 84 and the positive electrode lead 95 to each other via the sub-disc 89, the positive electrode lead 95 is prevented from being drawn from the hole portion 86a a when the safety valve 84 turns over. Further, the safety valve mechanism is electrically connected to the battery lid 83 via the heat sensitive resistance element 87.

In the safety valve mechanism, when the internal pressure of the non-aqueous electrolyte battery reaches or exceeds a certain level due to internal short circuit of the battery or heating from the outside of the battery or the like, the safety valve 84 turns over, which disconnects the electrical connection between the projecting portion 84a, the battery lid 83, and the wound electrode body 90. That is, when the safety valve 84 turns over, the positive electrode lead 95 is pressed by the shutoff disc 86 and the connection between the safety valve 84 and the positive electrode lead 95 is released. The disc holder 85 is formed of an insulating material, and the safety valve 84 and the shutoff disc 86 are insulated when the safety valve 84 is inverted.

Further, when gas is further generated inside the battery and the internal pressure of the battery further increases, a part of the safety valve 84 is broken, which makes it possible to discharge the gas to the side of the battery lid 83.

Further, for example, a plurality of gas vent holes (not shown) are provided around the hole portion 86a of the shutoff disc 86, which makes it possible to effectively discharge, in the case where gas is generated from the wound electrode body 90, the gas to the side of the battery lid 83, In the heat sensitive resistance element 87, the resistance value increases when the temperature rises, which cuts off current by disconnecting the electrical connection between the battery lid 83 and the wound electrode body 90, thereby preventing abnormal heat generation due to excessive current. The gasket 88 is formed of, for example, an insulating material, and asphalt is applied to the surface thereof.

The wound electrode body 90 housed in the non-aqueous electrolyte battery is wound around the center pin 94 as the center. The positive electrode 91 and the negative electrode 92 are laminated in order via the separator 93 and wound in the longitudinal direction, thereby forming the wound electrode body 90. The positive electrode lead 95 is connected to the positive electrode 91, and a negative electrode lead 96 is connected to the negative electrode 92. As described above, the positive electrode lead 95 is welded to the safety valve 84 and electrically connected to the battery lid 83, and the negative electrode lead 96 is welded to the battery can 81 and electrically connected thereto.

Figure 3:
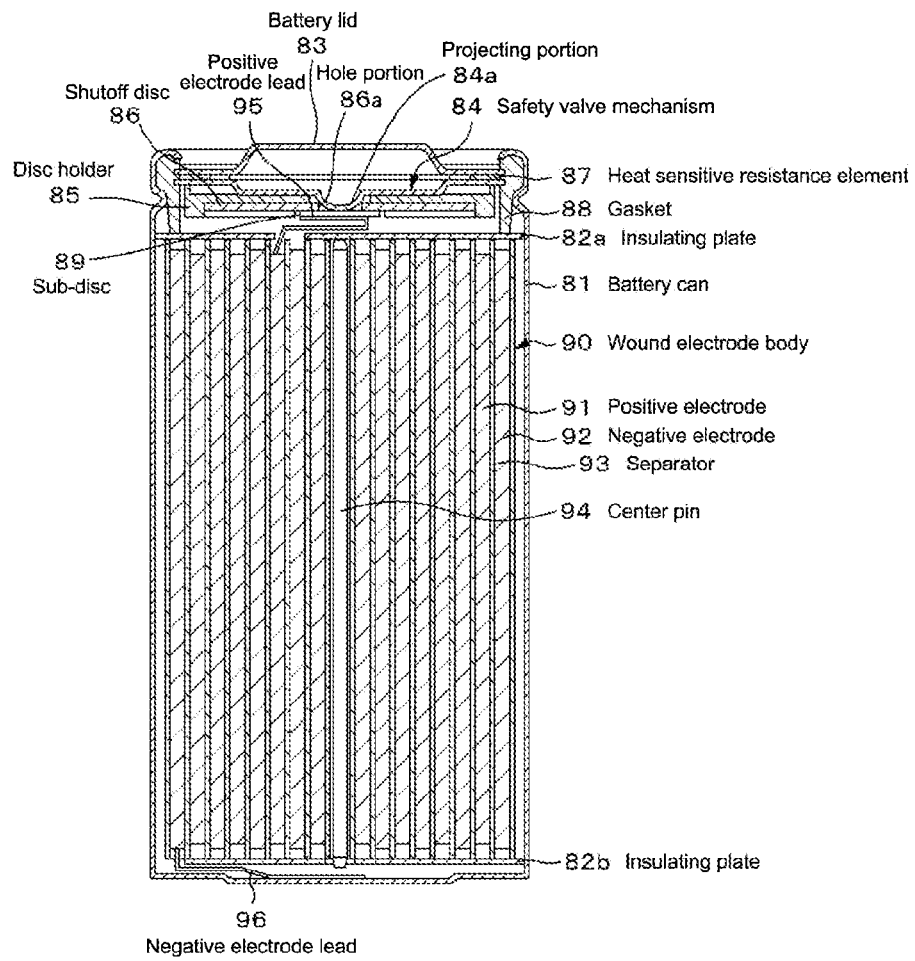
FIG. 3 is a cross-sectional view showing a configuration of a cylindrical non-aqueous electrolyte battery according to an embodiment of the present technology.

As shown in FIG. 3, the positive electrode 91, the separator 93, and the negative electrode 92 are alternately laminated and wound. Hereinafter, the positive electrode 91, the negative electrode 92, and the separator 93 will be described.

[Positive Electrode]

In the positive electrode 91, for example, a positive electrode active material layer is formed on both surfaces of a positive electrode current collector. Note that a region where the positive electrode active material layer is formed only on one surface of the positive electrode current collector may be provided.

The positive electrode active material layer is configured to include any one or two or more kinds of positive electrode active materials capable of absorbing and releasing lithium, and may contain another material such as a binding agent and a conductive agent as necessary. Note that as materials of the positive electrode current collector, the positive electrode active material, the conductive agent, the binding agent, and the positive electrode lead 95, the connection structure of the positive electrode lead 95, and the like, materials and a connection structure similar to those of the first embodiment can be used.

[Negative Electrode]

In the negative electrode 92, for example, a negative electrode active material layer is formed on both surfaces of a negative electrode current collector. Note that a region where the negative electrode active material layer is formed only on one surface of the negative electrode current collector may be provided.

The negative electrode active material layer is configured to include any one or two or more kinds of negative electrode active materials capable of absorbing and releasing lithium, and may contain, as necessary, another material such as a binding agent and a conductive agent similar to those of the positive electrode active material layer. Note that as the negative electrode current collector, the negative electrode active material, the conductive agent, the binding agent, the negative electrode lead 96, the connection structure of the negative electrode lead 96, and the like, materials and a connection structure similar to those of the first embodiment can be used.

[Separator]

The separator 93 is similar to the separator 55 in the first embodiment.

[Non-Aqueous Electrolyte Solution]

The non-aqueous electrolyte solution is similar to that of the first embodiment.

(Surface-Modified Aluminum Hydroxide)

The surface-modified aluminum hydroxide is contained in at least one of the non-aqueous electrolyte solution, the positive electrode active material layer, and the negative electrode active material layer, but it is favorably contained in at least the non-aqueous electrolyte solution (non-aqueous electrolyte).

(2-2) Method of Producing Cylindrical Non-Aqueous Electrolyte Battery (Method of Producing Positive Electrode, Negative Electrode, and Separator)

The positive electrode 91 and the negative electrode 92 are prepared similarly to the first embodiment. Note that at this time, the surface-modified aluminum hydroxide may be contained in at least one of the positive electrode active material layer and the negative electrode active material layer. Further, the separator 93 is prepared similarly to the first embodiment.

(Preparation of Non-Aqueous Electrolyte Solution)

The non-aqueous electrolyte solution is prepared by dissolving an electrolyte salt in a non-aqueous solvent. Note that at this time, it is favorable to add the surface-modified aluminum hydroxide to the non-aqueous electrolyte solution.

(Assembly of Non-Aqueous Electrolyte Battery)

The positive electrode lead 95 is attached to the positive electrode current collector by welding or the like, and the negative electrode lead 96 is attached to the negative electrode current collector by welding or the like. After that, the positive electrode 91 and the negative electrode 92 are wound via the separator 93 to form the wound electrode body 90.

A tip portion of the positive electrode lead 95 is welded to the safety valve mechanism, and a tip portion of the negative electrode lead 96 is welded to the battery can 81. After that, the wound surface of the wound electrode body 90 is sandwiched between the pair of insulating plates 82$a$ and 82$b$, and housed inside the battery can 81. After the wound electrode body 90 is housed in the battery can 81, the non-aqueous electrolyte solution is injected into the battery can 81 and impregnated into the separator 93. After that, the safety valve mechanism including the battery lid 83, the safety valve 84, and the like, and the heat sensitive resistance element 87 are fixed to an opening end portion of the battery can 81 by being caulked via the gasket 88. In this way, the cylindrical non-aqueous electrolyte battery shown in FIG. 3 is formed.

In this non-aqueous electrolyte battery, when charging is performed, for example, lithium ions are released from the positive electrode active material layer and absorbed in the negative electrode active material layer via the non-aqueous electrolyte solution impregnated in the separator 93. Further, when discharging is performed, for example, lithium ions are released from the negative electrode active material layer and absorbed in the positive electrode active material layer via the non-aqueous electrolyte solution impregnated in the separator 93.

(Effects)

Also in the non-aqueous electrolyte battery according to the second embodiment of the present technology, effects similar to those of the first embodiment are exerted.

3. Third Embodiment

Figure 4:
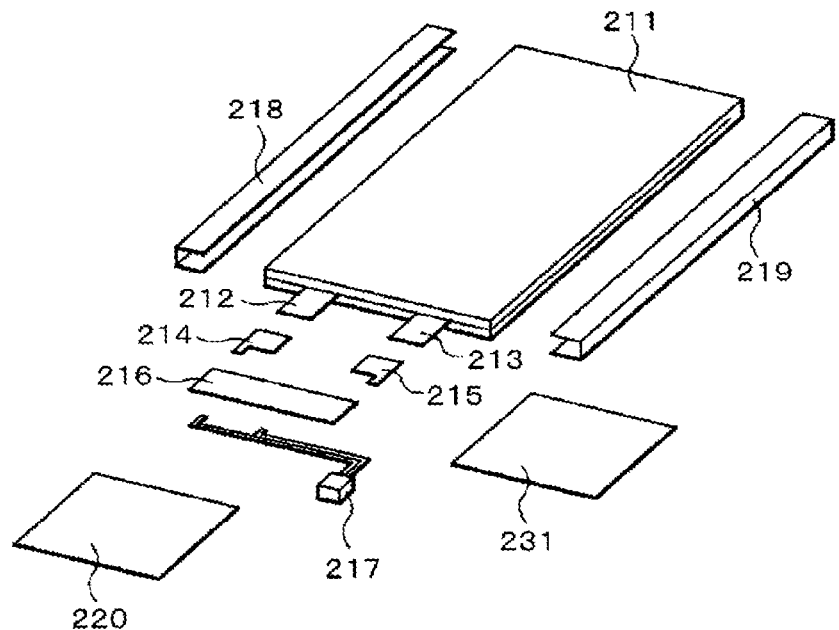
FIG. 4 is a perspective view showing a configuration of an application example (battery pack: single battery) of a secondary battery.
Figure 5:
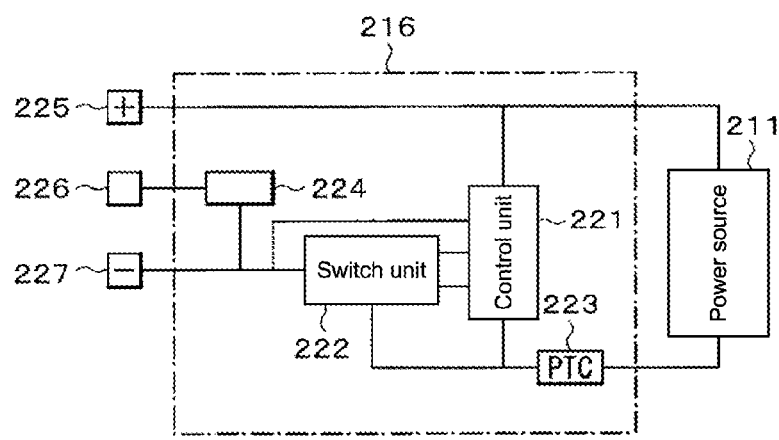
FIG. 5 is a block diagram showing a configuration of the battery pack shown in FIG. 4.

FIG. 4 shows a perspective configuration in the state where a battery pack using a single battery is disassembled. FIG. 5 shows a block configuration of the battery pack shown in FIG. 4.

The battery pack described here is a simplified type battery pack (so-called soft pack) using one secondary battery, and is built in, for example, an electronic apparatus typified by a smartphone. As shown in FIG. 4, for example, this battery pack includes a battery cell 211 formed of a laminated film type secondary battery similar to that of the first embodiment, and a circuit board 216 connected to the battery cell 211.

A pair of adhesive tapes 218 and 219 is attached to both side surfaces of the battery cell 211. On the circuit board 216, a protection circuit (PCM: Protection Circuit Module) is formed. The circuit board 216 is connected to a positive electrode lead 212 and a negative electrode lead 213 of the battery cell 211 via a pair of tabs 214 and 215, and also to a lead 217 with a connector for external connection. Note that in the state where the circuit board 216 is connected to the battery cell 211, the circuit board 216 is fixed and protected from above and below by a label 220 and an insulating sheet 231.

Further, as shown in FIG. 5, for example, the battery pack includes the battery cell 211 corresponding to a power source, and the circuit board 216. The circuit board 216 includes, for example, a control unit 221, a switch unit 222, a PTC 223, and a temperature detection unit 224. Because the battery cell 211 can be connected to the outside via a positive electrode terminal 225 and a negative electrode terminal 227, the battery cell 211 is charged and discharged via the positive electrode terminal 225 and the negative electrode terminal 227. The temperature detection unit 224 is capable of detecting the temperature using a temperature detection terminal (so-called T terminal) 226.

The control unit 221 controls the operation of the entire battery pack (including the use state of the battery cell 211), and includes a central processing unit (CPU), a memory, and the like.

For example, when the battery voltage reaches the overcharge detection voltage, the control unit 221 disconnects the switch unit 222 so that no charging current flows through the current path of the battery cell 211. Further, for example, when a large amount of current flows during charging, the control unit 221 disconnects the switch unit 222 and cuts off the charging current.

In addition thereto, for example, when the battery voltage reaches the overdischarge detection voltage, the control unit 221 disconnects the switch unit 222 so that no discharge current flows through the current path of the battery cell 211. Further, for example, when a large amount of current flows during discharging, the control unit 221 cuts off the discharge current by disconnecting the switch unit 222.

Note that the overcharge detection voltage of the secondary battery is, for example, 4.20 V±0.05 V, and the overdischarge detection voltage is, for example, 2.4 V±0.1 V.

The switch unit 222 switches the use state of the battery cell 211 (availability of the connection between the battery cell 211 and an external apparatus) according to an instruction from the control unit 221. This switch unit 222 includes a charge control switch, a discharge control switch, and the like, and is formed of, for example, field effect transistors (MOSFETs) using a metal oxide semiconductor. Note that the charge/discharge current is detected on the basis of, for example, the ON resistance of the switch unit 222.

The temperature detection unit 224 measures the temperature of the battery cell 211, outputs the measurement result to the control unit 221, and includes, for example, a temperature detection element such as a thermistor. Note that the measurement result by the temperature detection unit 224 is used in the case where the control unit 221 performs charge and discharge control at the time of abnormal heat generation or where the control unit 221 performs correction processing at the time of calculation of the remaining capacity, or the like.

Note that the circuit board 216 does not necessary need to include the PTC 223. In this case, a separate PTC element may be attached to the circuit board 216.

4. Fourth Embodiment

Figure 6:
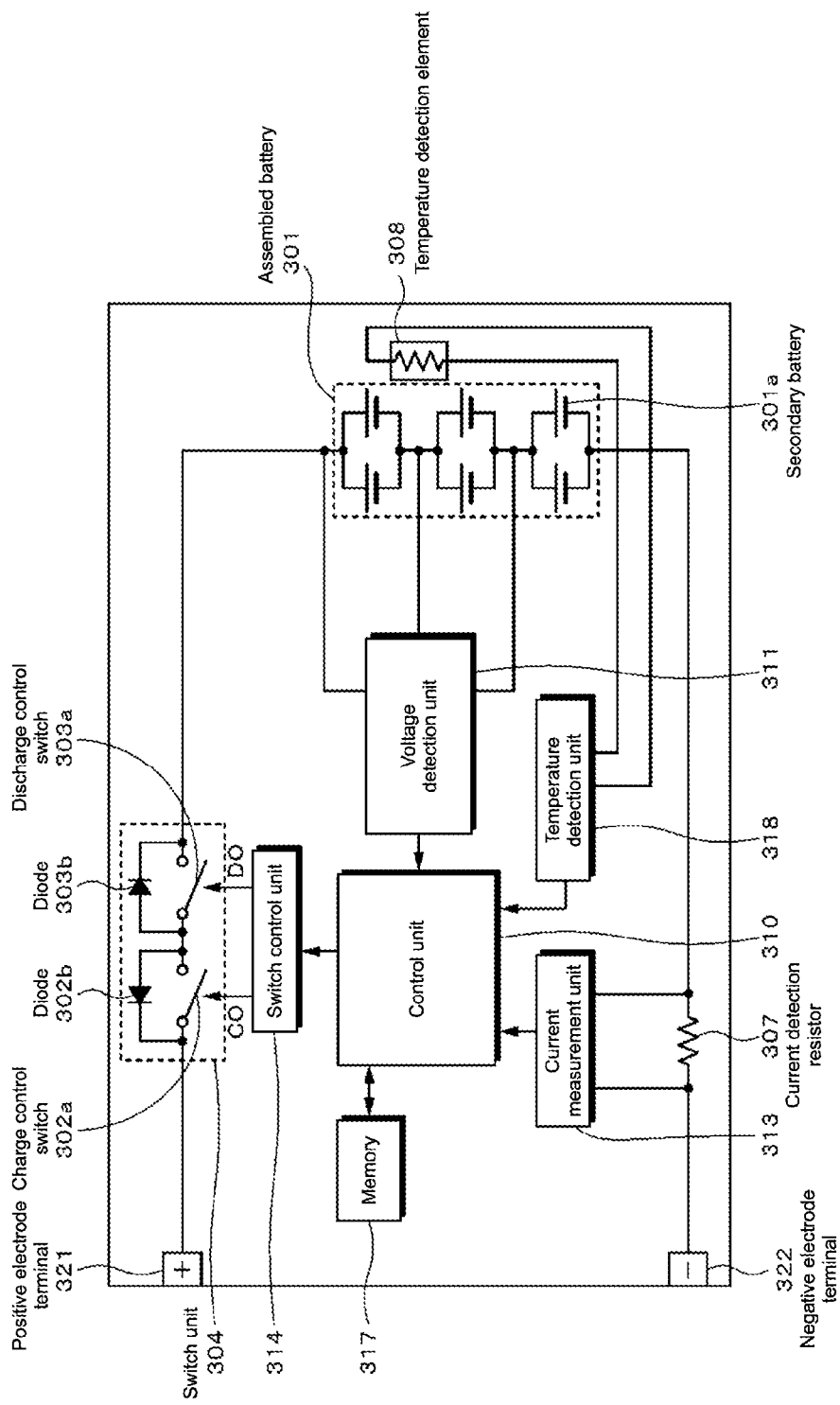
FIG. 6 is a block diagram showing a circuit configuration example of a power storage apparatus according to the embodiment of the present technology.

FIG. 6 is a block diagram showing a circuit configuration example of a case where the secondary battery according to the first and second embodiments of the present technology is applied to a power storage apparatus (power storage module). The power storage apparatus includes an assembled battery 301, an exterior, a switch unit 304 having a charge control switch 302a and a discharge control switch 303a, a current detection resistor 307, a temperature detection element 308, and a control unit 310.

Further, in the power storage apparatus, a positive electrode terminal 321 and a negative electrode terminal 322 are respectively connected to a positive electrode terminal and a negative electrode terminal of a charger, and the charging and discharging are carried out.

The assembled battery 301 is configured with a plurality of the secondary batteries 301a connected to one another in series and/or in parallel. The secondary battery 301a is a secondary battery of an embodiment of the present technology. Note that although a case where the six secondary batteries 301a are connected in two batteries in parallel and three in series (2P3S configuration) is shown in FIG. 6 as an example, any way of connections such as n in parallel and m in series (where n and m are integers) may be adopted.

The switch unit 304 includes a charge control switch 302a and a diode 302b, and a discharge control switch 303a and a diode 303b and is controlled by a control unit 310. The diode 302b has the polarity in opposite direction with respect to charge current flowing from the positive electrode terminal 321 to the assembled battery 301 and in forward direction with respect to discharge current flowing from the negative electrode terminal 322 to the assembled battery 301. The diode 303b has the polarity in forward direction with respect to the charge current and in opposite direction with respect to the discharge current. Note that although in this example the switch unit 304 is provided on the positive electrode terminal side, it may otherwise be provided on the negative electrode terminal side.

The charge control switch 302a is turned off in the case where a battery voltage reaches an overcharge detection voltage, and it is controlled by the control unit such that the charge current does not flow in a current path of the assembled battery 301. After the charge control switch 302a is turned off, only discharge can be performed via the diode 302b. Further, in the case where a large amount of current flows during charging, the charge control switch 302a is turned off and is controlled by the control unit 310 such that the charge current flowing in the current path of the assembled battery 301 is shut off.

The discharge control switch 303a is turned off in the case where a battery voltage reaches an overdischarge detection voltage, and it is controlled by the control unit 310 such that the discharge current does not flow in a current path of the assembled battery 301. After the discharge control switch 303a is turned off, only charge can be performed via the diode 303b. Further, in the case where a large amount of current flows at a time of discharge, the discharge control switch 303a is turned off and is controlled by the control unit 310 such that the discharge current flowing in the current path of the assembled battery 301 is shut off.

A temperature detection element 308 is a thermistor, for example, provided in the vicinity of the assembled battery 301. The temperature detection element 308 measures a temperature of the assembled battery 301 and supplies the measured temperature to the control unit 310. A voltage detection unit 311 measures voltages of the assembled battery 301 and each of the secondary batteries 301a constituting the assembled battery 301, A/D-converts the measured voltages, and supplies them to the control unit 310. A current measurement unit 313 measures a current using a current detection resistor 307 and supplies the measured current to the control unit 310.

The switch control unit 314 controls the charge control switch 302a and the discharge control switch 303a of the switch unit 304 on the basis of the voltage and the current that are input from the voltage detection unit 311 and the current measurement unit 313. The switch control unit 314 transmits a control signal to the switch unit 304 when a voltage of any one of secondary batteries 301a reaches not more than the overcharge detection voltage or not more than the overdischarge detection voltage, or when a large amount of current flows rapidly, thereby preventing overcharge and overdischarge.

Here, in the case where the secondary battery is a lithium-ion secondary battery, an overcharge detection voltage is defined to be 4.20 V±0.05 V, for example, and an overdischarge detection voltage is defined to be 2.4 V±0.1 V, for example.

For a charge and discharge control switch, a semiconductor switch such as a MOSFET) can be used. In this case, parasitic diodes of the MOSFET function as the diodes 302b and 303b. In the case where p-channel FETs are used as the charge and discharge control switch, the switch control unit 314 supplies a control signal DO and a control signal CO to a gate of the charge control switch 302a and a gate of the discharge control switch 303a, respectively. In the case where the charge control switch 302a and the discharge control switch 303a are of p-channel type, the charge control switch 302a and the discharge control switch 303a are turned on by a gate potential lower than a source potential by not less than a predetermined value. In other words, in normal charge and discharge operations, the control signals CO and DO are determined to be a low level, and the charge control switch 302a and the discharge control switch 303a are turned on.

Further, for example, when overcharged or overdischarged, the control signals CO and DO are determined to be a high level and the charge control switch 302a, and the discharge control switch 303a are turned off.

A memory 317 includes a RAM or a ROM, and include, for example, an EPROM (Erasable Programmable Read Only Memory) serving as a nonvolatile memory. In the memory 317, numerical values computed by the control unit 310, an internal resistance value of a battery in an initial state of each secondary battery 301a, which has been measured in a stage of a manufacturing process, and the like are stored in advance, and can be rewritten as appropriate. Further, when a full charge capacity of the secondary battery 301a is stored, for example, a remaining capacity can be calculated together with the control unit 310.

In a temperature detection unit 318, the temperature detection element 308 is used to measure the temperature, and control of charging or discharging when abnormal heat generation has occurred, and correction in calculation of the remaining capacity is performed.

5. Fifth Embodiment

The above-mentioned battery, battery pack, and power storage apparatus according to the first to fourth embodiments of the present technology can be installed in or used for providing power to an electronic apparatus, an electric vehicle, a power storage system, and a power system, for example.

Examples of the electronic apparatus include laptops, smartphones, tablet terminals, PDA (Personal Digital Assistant), cellular phones, wearable equipment, cordless telephone handsets, video movies, digital still cameras, electronic books, electronic dictionaries, music players, radios, headphones, game machines, navigation systems, memory cards, pacemakers, hearing aids, electric tools, electric shavers, refrigerators, air conditioners, television receivers, stereos, water heaters, microwave ovens, dishwashers, washing machines, dryers, lighting equipment, toys, medical equipment, robots, load conditioners, and traffic lights.

Examples of the electric vehicle include railway vehicles, golf carts, electric carts, and electric automobiles (including hybrid automobiles). The batteries and the battery packs are used as their driving power source or auxiliary power source.

Examples of the power storage apparatus include power sources for electrical storage to be used by buildings such as houses or by power generation facilities.

A specific example of a power storage system using the above-mentioned power storage apparatus according to the present technology will be described below.

The power storage system may employ the following configurations, for example. A first power storage system is a power storage system having a power storage apparatus charged by a power generation apparatus that generates power from renewable energy. A second power storage system has a power storage apparatus, and provides power to an electronic apparatus connected to the power storage apparatus. A third power storage system is a power storage system including an electronic apparatus that receives power supply from a power storage apparatus. These power storage systems are realized as a system that efficiently supplies power in cooperation with an external power supply network.

Furthermore, a fourth power storage system is an electric vehicle including a converting apparatus that receives power supply from an power storage apparatus and converts the power into a driving force for a vehicle, and a control apparatus that performs information processing relating to vehicle control on the basis of information on the power storage apparatus. A fifth power storage system is an power system that includes a power information transmitting-receiving unit that transmits/receives signals to/from other apparatuses via a network and controls the charge and discharge of the above-mentioned power storage apparatus on the basis of information received by the transmitting-receiving unit. A sixth power storage system is a power system that receives power supply from the above-mentioned power storage apparatus or provides the power storage apparatus with power from a power generation apparatus or a power network. The power storage system applied to a house and an electric vehicle will be described below.

(5-1) (Power Storage System in House)

Figure 7:
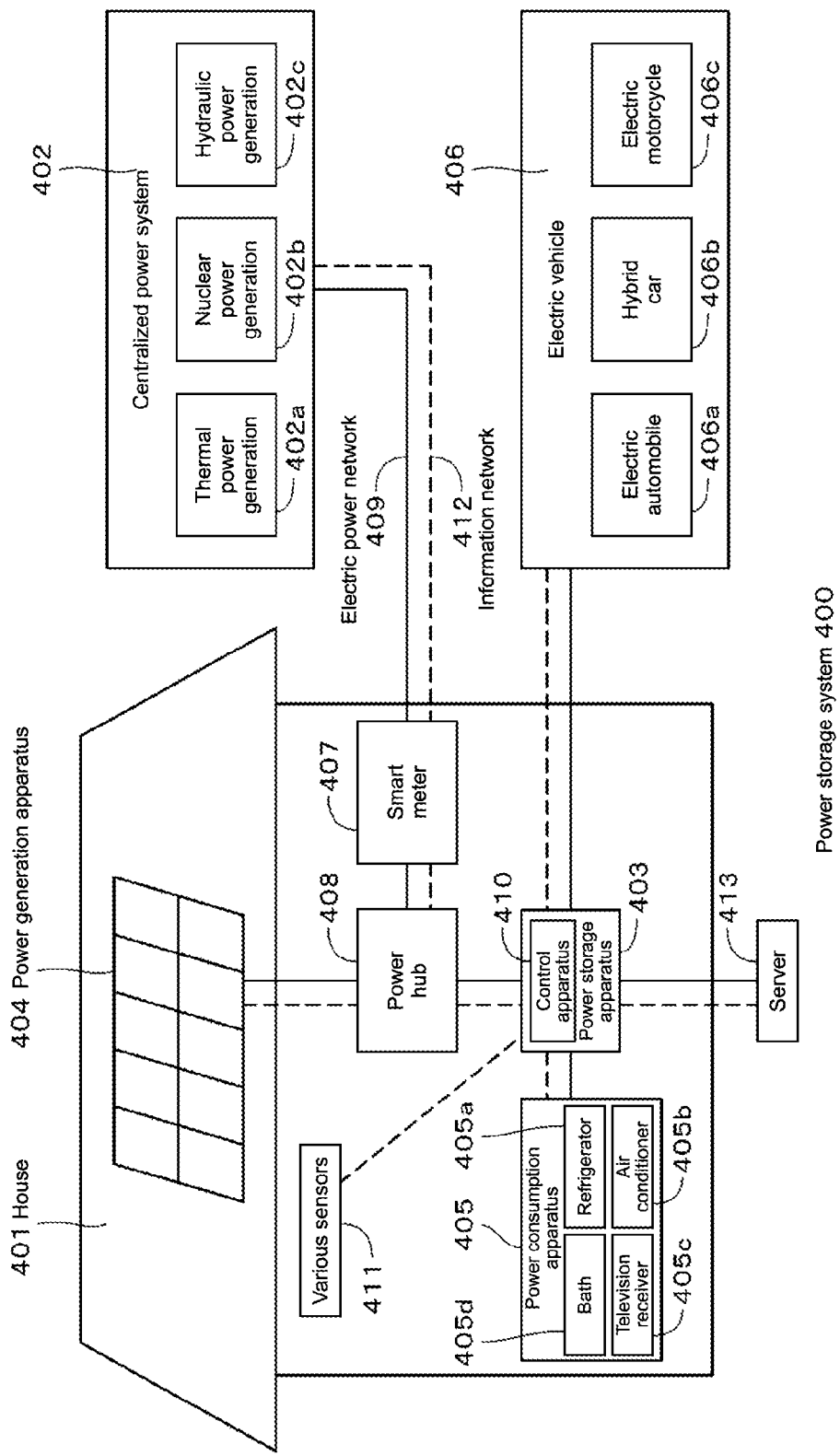
FIG. 7 is a schematic diagram showing an example in which the non-aqueous electrolyte battery according to the present technology is applied to a power storage system for a house.

For example, as shown in FIG. 7, in a power storage system 400 for a house 401, electric power is supplied from a centralized power system 402 such as a thermal power generation 402a, a nuclear power generation 402b, and a hydraulic power generation 402c to a power storage apparatus 403 via an electric power network 409, an information network 412, a smart meter 407, a power hub 408, and the like. In addition, electric power is supplied from an independent power source such as a domestic power generation apparatus 404 to the power storage apparatus 403. The electric power supplied to the power storage apparatus 403 is stored. The power storage apparatus 403 is used to supply electric power to be used in the house 401. It is not limited to the house 401, and a similar power storage system can be used for a building.

In the house 401, a power generation apparatus 404, a power consumption apparatus 405, the power storage apparatus 403, a control apparatus 410 that controls each apparatus, the smart meter 407, and sensors 411 that acquire various types of information are provided. The respective apparatuses are connected to one another via the electric power network 409 and the information network 412. As the power generation apparatus 404, a solar battery, a fuel battery, and the like are used. The generated electric power is supplied to the power consumption apparatus 405 and/or the power storage apparatus 403. The power consumption apparatus 405 includes, for example, a refrigerator 405*a*, an air conditioner 405*b* that is an air conditioning apparatus, a television receiver 405*c*, and a bath 405*d*. Further, the power consumption apparatus 405 includes an electric vehicle 406. The electric vehicle 406 is an electric automobile 406*a*, a hybrid car 406*b*, or an electric motorcycle 406*c*.

The smart meter 407 has a function of monitoring the amount of use of commercial electric power and transmitting the measured amount of use to an electric power company. The power supply of the electric power network 409 may be any one of direct-current power supply, alternating current power supply, and non-contact power supply or combination thereof.

Examples of the various sensors 411 include a motion sensor, an illuminance sensor, an object detection sensor, a power consumption sensor, a vibration sensor, a contact sensor, a temperature sensor, and an infrared sensor. The information acquired by the various sensors 411 is transmitted to the control apparatus 410. On the basis of the information from the sensors 411, a weather state, a person state, and the like are grasped, and it is possible to minimize the energy consumption by automatically controlling the power consumption apparatus 405. Further, the control apparatus 410 is capable of transmitting information on the house 401 to the external electric power company and the like via the Internet.

The power hub 408 executes processing such as branching of a power line and direct current/alternating current conversion. Examples of the communication system of the information network 412 connected to the control apparatus 410 include a method of using a communication interface such as a UART (Universal Asynchronous Receiver-Transceiver: transmission/reception circuit for asynchronous serial communication), and a method of using a sensor network that conforms to wireless communication standards such as Bluetooth, ZigBee, and Wi-Fi. The Bluetooth system is applied to multimedia communication, and one-to-many connection communication can be performed. ZigBee uses the physical layer of IEEE (Institute of Electrical and Electronics Engineers) 802.15.4. The IEEE802.15.4 is a name of a short-range wireless network standard called PAN (Personal Area Network) or W (Wireless) PAN.

The control apparatus 410 is connected to an external server 413. This server 413 may be managed by any one of the house 401, the electric power company, and a service provider. Information transmitted/received to/from the server 413 is, for example, power consumption information, life pattern information, electric power charge, weather information, disaster information, or information on power transaction. Such information may be transmitted/received to/from the domestic power consumption apparatus (e.g., television receiver). However, it may be transmitted/received to/from an apparatus (e.g., mobile phone) outside the house. Such information may be displayed on an apparatus having a display function such as a television receiver, a mobile phone, and a PDA (Personal Digital Assistants).

The control apparatus 410 that controls the respective blocks includes a CPU, a RAM, a ROM, and the like, and is stored in the power storage apparatus 403 in this example. The control apparatus 410 is connected to the power storage apparatus 403, the domestic power generation apparatus 404, the power consumption apparatus 405, the various sensors 411, and the server 413 via the information network 412. The control apparatus 410 has a function of adjusting the amount of use of commercial electric power and the amount of power generation, for example. Note that the control apparatus 410 may additionally have a function of performing power transaction in a power market, for example.

As described above, electric power generated not only by the centralized power system 402 such as the thermal power generation 402*a*, the nuclear power generation 402*b*, and the hydraulic power generation 402*c* but also by the domestic power generation apparatus 404 (solar power generation, wind power generation) can be stored in the power storage apparatus 403. Therefore, even when the amount of electric power generated by the domestic power generation apparatus 404 fluctuates, it is possible to perform control, e.g., keep the amount of electric power transmitted to the outside constant or discharge only a necessary amount of electric power. For example, a possible method is to store electric power obtained by solar power generation in the power storage apparatus 403, and store cheaper midnight electric power in the power storage apparatus 403 at night and use the electric power stored in the power storage apparatus 403 by discharging it in the daytime when power is more expensive.

Note that although the example in which the control apparatus 410 is housed in the power storage apparatus 403 has been described in this example, the control apparatus 410 may be housed in the smart meter 407 or may be independently configured. Further, the power storage system 400 may be used for a plurality of houses in an apartment building or for a plurality of detached houses.

(5-2) Power Storage System in Electric Vehicle

Figure 8:
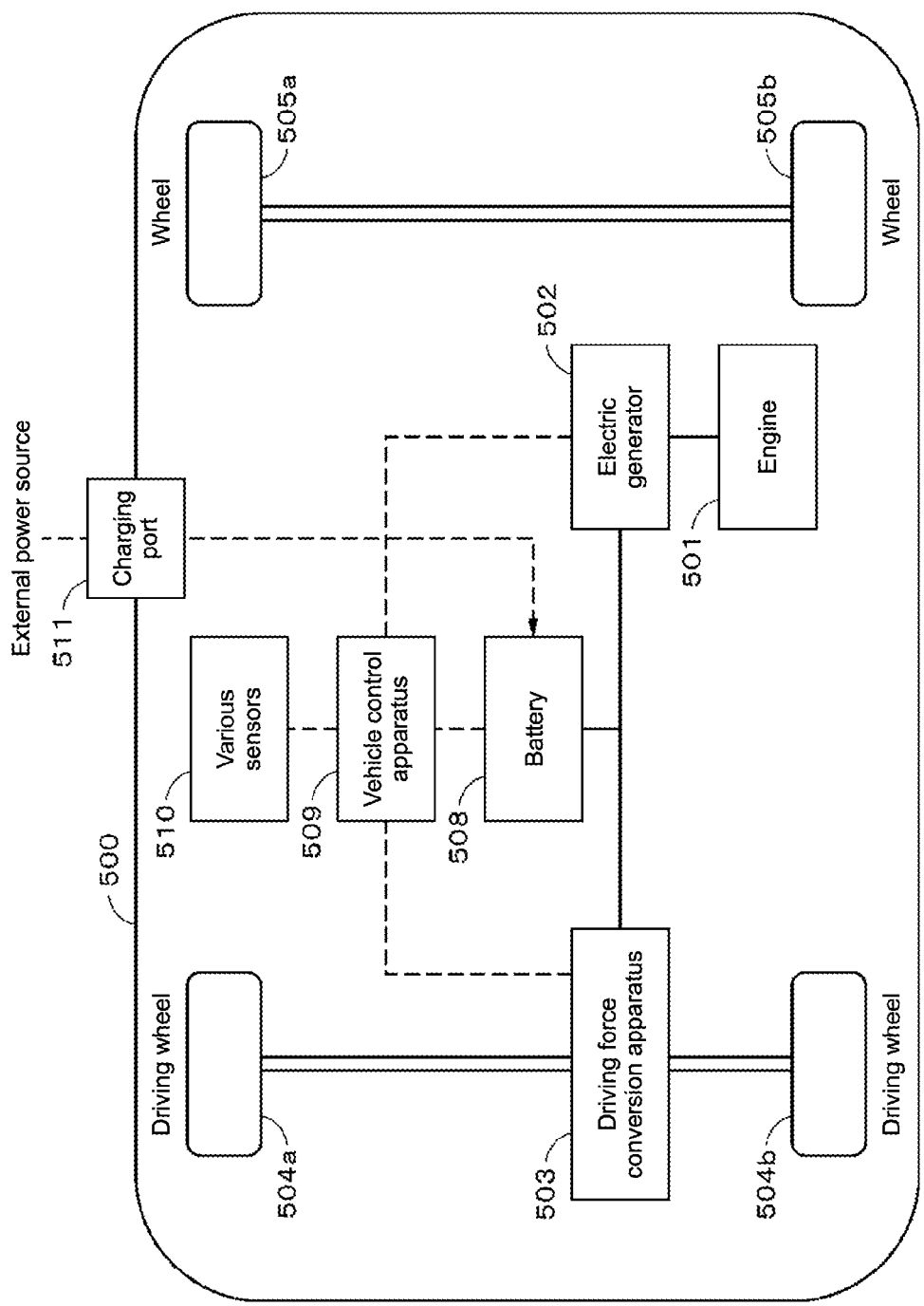
FIG. 8 is a schematic diagram schematically showing an example of a configuration of a hybrid vehicle that employs a series hybrid system to which the present technology is applied.

FIG. 8 schematically shows an example of the configuration of a hybrid vehicle that employs a series hybrid system to which the present technology is applied. A vehicle of the series hybrid system runs with an electric power/driving force conversion apparatus by using electric power generated in an electric generator driven by an engine or electric power temporarily stored in a battery.

This hybrid vehicle 500 includes an engine 501, an electric generator 502, an electric power/driving force conversion apparatus 503, a driving wheel 504*a*, a driving wheel 504*b*, a wheel 505*a*, a wheel 505*b*, a battery 508, a vehicle control apparatus 509, various sensors 510, and a charging port 511. The above-mentioned battery according to the present technology is applied to the battery 508.

The hybrid vehicle 500 runs by using the electric power/driving force conversion apparatus 503 as a power source. An example of the electric power/driving force conversion apparatus 503 is a motor. The electric power/driving force conversion apparatus 503 is actuated due to electric power of the battery 508 and torque of the electric power/driving force conversion apparatus 503 is transmitted to the driving wheels 504*a* and 504*b*. Note that the electric power/driving force conversion apparatus 503 can be applied as both of an alternating-current motor and a direct-current motor by using direct current-alternating current (DC-AC) or reverse conversion (AC-DC conversion) at a necessary portion. The various sensors 510 controls r.p.m. of the engine via the vehicle control apparatus 509, opening (throttle opening) of a throttle valve (not shown), and the like. The various sensors 510 include a velocity sensor, an acceleration sensor, an engine r.p.m. sensor, and the like.

The torque of the engine 501 is transmitted to the electric generator 502, and electric power generated with the torque by the electric generator 502 can be stored in the battery 508.

When the hybrid vehicle 500 is decelerated by a braking mechanism (not shown), resistance force at the time of the deceleration is added to the electric power/driving force conversion apparatus 503 as torque, and regenerative electric power generated with this torque by the electric power/driving force conversion apparatus 503 is stored in the battery 508.

By being connected to a power source outside the hybrid vehicle 500, the battery 508 is also capable of receiving electric power supply from the external power source by using the charging port 511 as an input port, and storing the received electric power.

Although not shown in the figure, an information processing apparatus that executes information processing relating to vehicle control on the basis of information on a secondary battery may be provided. Examples of such an information processing apparatus include an information processing apparatus that displays the remaining capacity of the battery on the basis of information on the remaining capacity of the battery.

Note that the series hybrid vehicle that runs with the motor by using electric power generated by the electric generator driven by the engine or electric power temporarily stored in the battery has been described above as an example. However, the present technology can be effectively applied also to a parallel hybrid vehicle that uses output of an engine and output of a motor as driving sources and appropriately switches three systems of running with only the engine, running with only the motor, and running with the engine and the motor for the use. Further, the present technology can be effectively applied also to a so-called electric vehicle, which does not use an engine and runs by driving of only a driving motor.

EXAMPLE

Hereinafter, the present technology will be described in detail by Examples. Note that the present technology is not limited to the configuration of the following Examples.

Example 1

(Synthesis of Surface-Modified Aluminum Hydroxide)

One point zero g of triethoxyvinylsilane (manufactured by Tokyo Chemical Industry Co., Ltd.) was added to 1.0 g of an aluminum hydroxide (manufactured by High Purity Chemical Co., Ltd.), heated at 120° C., and dried in vacuum to obtain a surface-modified aluminum hydroxide (A).

(Preparation of Positive Electrode)

Ninety one parts by mass of lithium cobalt composite oxide ($LiCoO_2$) as a positive electrode active material, 6 parts by mass of graphite as a conducting agent, and 10 parts by mass of polyvinylidene fluoride (PVdF) as a binding agent were homogeneously mixed, and dispersed in N-methyl-2-pyrrolidone (NMP) to obtain a positive electrode mixture slurry. The positive electrode mixture slurry thus obtained was uniformly applied to both surfaces of a strip-shaped aluminum foil having a thickness of 12 μm to be a positive electrode current collector, and dried to form a positive electrode active material layer.

(Preparation of Negative Electrode)

Ninety parts by mass of artificial graphite as a negative electrode active material and 10 parts by mass of PVdF as a binding agent were homogeneously mixed, and dispersed in NMP to obtain a negative electrode mixture slurry. Next, the negative electrode mixture slurry thus obtained was uniformly applied to both surfaces of a strip-shaped copper foil having a thickness of 10 μm to be a negative electrode current collector, and dried to form a negative electrode mixture layer.

(Preparation of Non-Aqueous Electrolyte Material)

Those obtained by mixing 90 parts by mass of a non-aqueous electrolyte solution, 10 parts by mass of polyvinylidene fluoride-hexafluoropropylene copolymer (PVdF: HFP=93.1:6.9 (mass ratio)) as matrix resin, 5 parts by mass of alumina as ceramic powder, and 5 parts by mass of the surface-modified aluminum hydroxide (A) and adding dimethyl carbonate thereto as a viscosity adjusting solvent to adjust the viscosity to 50 mPa/s were used. Note that at this time, they were mixed so that the ceramic powder was uniformly dispersed in the non-aqueous electrolyte material.

A non-aqueous electrolyte solution prepared by dissolving lithium hexafluorophosphate ($LiPF_6$) as an electrolyte salt in a non-aqueous solvent so that the concentration thereof was 1.0 mol/kg was used. The non-aqueous solvent was obtained by mixing ethylene carbonate and propylene carbonate at a ratio of ethylene carbonate:propylene carbonate=5:5 (mass ratio). Further, because dimethyl carbonate is finally volatilized, it does not remain in the battery.

(Preparation of Non-Aqueous Electrolyte Secondary Battery)

The obtained non-aqueous electrolyte material was applied to the obtained positive electrode and negative electrode, and the positive electrode and the negative electrode were laminated via a separator formed of a microporous polyethylene film having a thickness of 7 μm and wound up, thereby obtaining the non-aqueous electrolyte secondary battery according to Example 1.

Example 2

A surface-modified aluminum hydroxide (B) (trade name: BE033T, manufactured by Nippon Light Metal Co., Ltd., surface processing: titanate processing) was used instead of the surface-modified aluminum hydroxide (A). A non-aqueous electrolyte secondary battery was prepared similarly to Example 1 except for the above.

Example 3

A surface-modified aluminum hydroxide (C) (trade name: BE033S, manufactured by Nippon Light Metal Co., Ltd., surface processing: stearic acid processing) was used instead of the surface-modified aluminum hydroxide (A). A non-aqueous electrolyte secondary battery was prepared similarly to Example 1 except for the above.

Example 4

A surface-modified aluminum hydroxide (D) (trade name: BE033S™, manufactured by Nippon Light Metal Co., Ltd., surface processing: methacryloxylan processing) was used instead of the surface-modified aluminum hydroxide (A). A non-aqueous electrolyte secondary battery was prepared similarly to Example 1 except for the above.

Example 5

A surface-modified aluminum hydroxide (E) (Trade name: BE033STA, manufactured by Nippon Light Metal Co., Ltd., surface processing: aminosilane processing) was used instead of the surface-modified aluminum hydroxide (A). A non-aqueous electrolyte secondary battery was prepared similarly to Example 1 except for the above.

Example 6

A surface-modified aluminum hydroxide (F) (Trade name: BE033STE, manufactured by Nippon Light Metal Co., Ltd., surface processing: epoxy silane processing) was used instead of the surface-modified aluminum hydroxide (A). A non-aqueous electrolyte secondary battery was prepared similarly to Example 1 except for the above.

Example 7

A surface-modified aluminum hydroxide (G) (Trade name: BE033STV, manufactured by Nippon Light Metal Co., Ltd., surface processing: vinyl silane processing) was used instead of the surface-modified aluminum hydroxide (A). A non-aqueous electrolyte secondary battery was prepared similarly to Example 1 except for the above.

Comparative Example 1

An aluminum hydroxide whose surface is not processed (manufactured by High Purity Chemical Co., Ltd.) was used instead of the surface-modified aluminum hydroxide (A). A non-aqueous electrolyte secondary battery was prepared similarly to Example 1 except for the above.

Comparative Example 2

The surface-modified aluminum hydroxide (A) was not added and the additive amount of alumina ($Al_2O_3$) was changed to 10 parts by mass. A non-aqueous electrolyte secondary battery was prepared similarly to Example 1 except for the above.

[Evaluation]

The following evaluation was performed on Examples 1 to 7 and Comparative Examples 1 and 2.

(Confirmation of Surface Processing)

The presence or absence of surface processing was confirmed using a differential scanning calorimeter: DSC (manufactured by RIGAKU). It was confirmed by raising the temperature at a rate of temperature increase of 20 K/min, and determining whether or not the endothermic decomposition temperature shifted to the higher temperature side than that of the unprocessed aluminum hydroxide.

(Battery Evaluation: Evaluation of Cycle Characteristics)

After performing one cycle of initial charge and discharge, a cycle test was conducted at room temperature. The cycle rate was 0.5 ItA. The 50 cycle retention rate was as shown in Table 2 below. Note that the "50 cycle retention rate" represents a value (%) of the discharge capacity at the 50th charge and discharge cycle after performing the initial charge and discharge when the discharge capacity at the first charge and discharge cycle is 100%. Further, the discharge was started at 4.35 volts and the discharge was finished at 3.0 volts.

TABLE 1

|  | Kind of additive | ※Endothermic peak temperature |
|---|---|---|
| Example 1 | Surface-modified aluminum hydroxide (A) | 320° C./359° C. |
| Example 2 | Surface-modified aluminum hydroxide (B) | 258° C./292° C. |
| Example 3 | Surface-modified aluminum hydroxide (C) | 258° C./308° C. |
| Example 4 | Surface-modified aluminum hydroxide (D) | 257° C./327° C. |
| Example 5 | Surface-modified aluminum hydroxide (E) | 271° C./302° C. |
| Example 6 | Surface-modified aluminum hydroxide (F) | 255° C./325° C. |
| Example 7 | Surface-modified aluminum hydroxide (G) | 255° C./325° C. |
| Comparative Example 1 | Aluminum hydroxide whose surface is not processed | —/268° C. |
| Comparative Example 2 | Alumina ($Al_2O_3$) | — |

※Sub-peak temperature/main peak temperature

TABLE 2

|  | Kind of additive | Cycle characteristics at room temperature (50 cycle retention rate [%]) |
|---|---|---|
| Example 1 | Surface-modified aluminum hydroxide (A) | 91.0 |
| Example 2 | Surface-modified aluminum hydroxide (B) | 90.0 |
| Example 3 | Surface-modified aluminum hydroxide (C) | 96.5 |
| Example 4 | Surface-modified aluminum hydroxide (D) | 96.5 |
| Example 5 | Surface-modified aluminum hydroxide (E) | 96.0 |
| Example 6 | Surface-modified aluminum hydroxide (F) | 92.0 |
| Example 7 | Surface-modified aluminum hydroxide (G) | 95.0 |
| Comparative Example 1 | Aluminum hydroxide whose surface is not processed | 85.0 |
| Comparative Example 2 | Alumina ($Al_2O_3$) | 89.0 |

Figure 9:
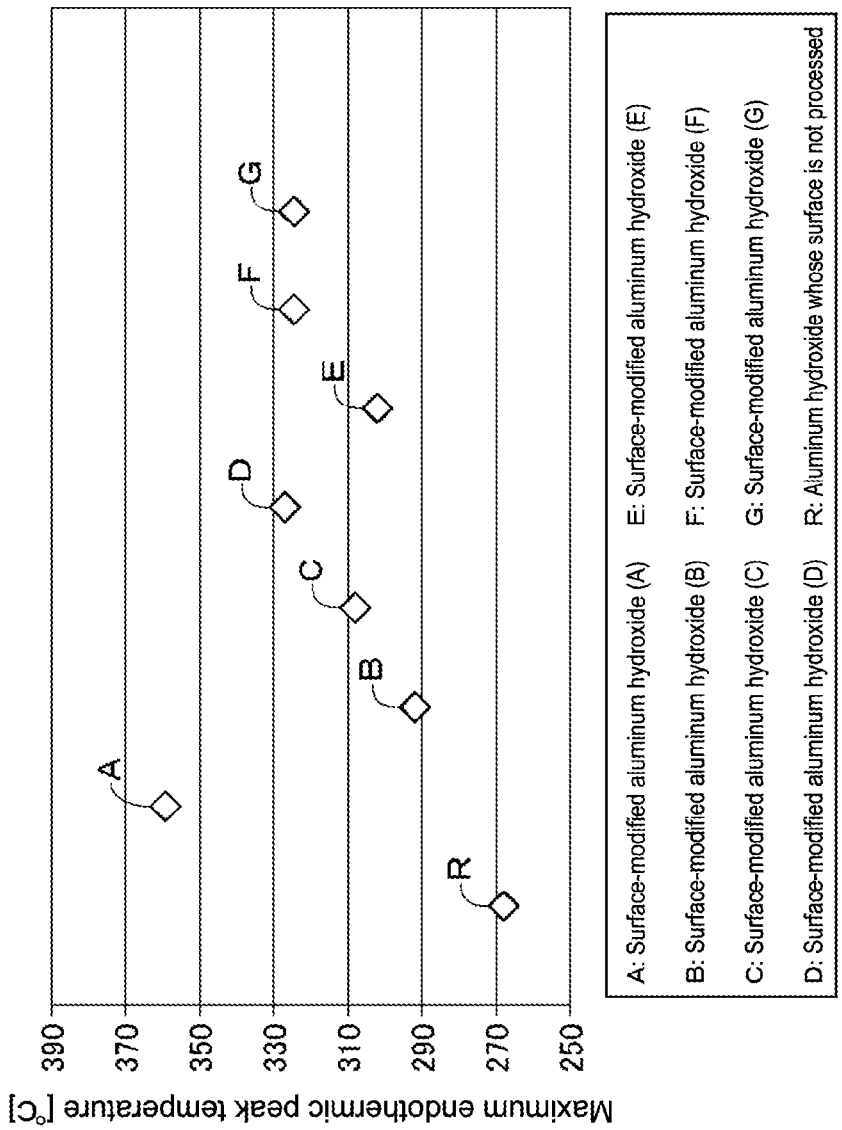
FIG. 9 is a graph showing measurement results of differential scanning calorimetry.

As shown in Table 1 and FIG. 9, in Examples 1 to 7, the maximum endothermic peak of the surface-modified aluminum hydroxide was in the range of not less than 270° C. and not more than 360° C. As shown in Table 2, it was confirmed that cycle characteristics at room temperature can be improved by the surface-modified aluminum hydroxide.

Note that although in the above-mentioned Examples and Comparative Examples, a mixture obtained by mixing alumina to the surface-modified aluminum hydroxide or aluminum hydroxide whose surface is not processed was added to a non-aqueous electrolyte material, even when the surface-modified aluminum hydroxide is added alone to the non-aqueous electrolyte material, there is a tendency that the cycle characteristics can be improved as compared with the case where an aluminum hydroxide whose surface is not processed is added alone to the non-aqueous electrolyte material, similarly.

6. Other Embodiments

Although the present technology has been described heretofore by embodiments and examples, the present technology is not limited to the above-mentioned embodiments and examples, and various modifications can be made without departing from the essence of the present technology.

For example, numerical values, structures, shapes, materials, raw materials, production processes, and the like mentioned in the above-mentioned embodiments and examples are merely examples, and different numerical values, structures, shapes, materials, raw materials, production processes, and the like may be used as necessary.

Further, the configurations, methods, steps, shapes, materials, numerical values, and the like of the above-mentioned embodiments and examples can be combined with each other as long as they do not depart from the essence of the present technology. For example, the non-aqueous electrolyte battery may be a primary battery.

Further, the electrolyte according to the present technology can be similarly applied to those having other battery structures such as square type, coin type, and button type. Further, in the first and second embodiments, a laminated electrode body may be used instead of the wound electrode body. Further, it is also applicable to a free shape battery, a foldable flexible battery, or the like mounted on a wearable terminal or the like.

The surface-modified aluminum hydroxide may be mixed with other solid particles such as inorganic oxide particles other than the surface-modified aluminum hydroxide and used.

It should be noted that the present technology may take the following configurations.

[1] An electrolyte, including:
an aluminum hydroxide, at least a part of a surface of the aluminum hydroxide being modified.

[2] The electrolyte according to [1], in which
the maximum endothermic peak temperature in differential scanning calorimetry of the aluminum hydroxide is not less than 270° C. and not more than 360° C.

[3] The electrolyte according to [2], in which
two endothermic peaks are observed in the differential scanning calorimetry.

[4] The electrolyte according to any one of [1] to [3], in which
the aluminum hydroxide is obtained by modifying the surface with a surface processing agent.

[5] The electrolyte according to [4], in which
the surface processing agent contains at least one of a silane coupling agent, a titanate-based coupling agent, an aluminate-based coupling agent, and a higher fatty acid surface processing agent.

[6] The electrolyte according to any one of [1] to [5], in which
the aluminum hydroxide has a coating portion containing at least one of an organic polymer compound and an inorganic compound different from an aluminum hydroxide, the coating portion being formed on at least a part of the surface of the aluminum hydroxide.

[7] The electrolyte according to any one of [1] to [6], further including:
an electrolyte solution; and
a polymer compound that holds the electrolyte solution.

[8] A battery, including:
a positive electrode;
a negative electrode; and
an electrolyte, in which
at least one of the electrolyte and the negative electrode contains an aluminum hydroxide, at least a part of a surface of the aluminum hydroxide being modified.

[9] The battery according to [8], in which
the positive electrode contains the aluminum hydroxide.

[10] The battery according to [8], further including
a separator, in which
the separator contains the aluminum hydroxide.

[11] A battery pack, including:
the battery according to any one of [8] to [10];
a control unit that controls the battery; and
an exterior that houses the battery.

[12] An electronic apparatus, that receives power supply from the battery according to any one of [8] to [10].

[13] An electric vehicle, including:
the battery according to any one of [8] to [10];
a converting apparatus that receives supply of power from the battery and converts the received power into a driving force for the electric vehicle; and
a control apparatus that performs information processing relating to vehicle control on the basis of information on the battery.

[14] A power storage apparatus, including:
the battery according to any one of [8] to [10], in which
the power storage apparatus supplies power to an electronic apparatus connected to the battery.

[15] The power storage apparatus according to [14], further including
a power information control apparatus that transmits/receives a signal to/from another apparatus via a network, in which
the power storage apparatus controls, on the basis of information received by the power information control apparatus, charge and discharge of the battery.

[16] A power system, that receives power supply from the battery according to any one of [8] to [10].

[17] The power system according to [16], in which
power is supplied from a power generation apparatus or a power network to the battery.

REFERENCE SIGNS LIST

50 wound electrode body
51 positive electrode lead
52 negative electrode lead
53 positive electrode
53A positive electrode current collector
53B positive electrode active material layer 54 negative electrode
54A negative electrode current collector
54B negative electrode active material layer
55 separator
56 electrolyte layer
57 protective tape
60 exterior member
61 adhesion film
91 positive electrode
92 negative electrode
93 separator
211 battery cell (power source)
221 control unit
301 assembled battery
301a secondary battery
400 power storage system
403 power storage apparatus
404 power generation apparatus
406 electric vehicle
409 electric power network
410 control apparatus
412 information network
503 driving force conversion apparatus
508 battery
509 vehicle control apparatus

The invention claimed is:

1. A battery, comprising:
a positive electrode;
a negative electrode; and
an electrolyte,
wherein at least one of the electrolyte and the negative electrode comprises a surface-modified aluminum hydroxide, wherein at least part of a surface of the surface-modified aluminum hydroxide is modified with one or more of a processing agent and a derivative thereof, wherein the processing agent and/or a derivative thereof is bound to the surface of the surface-modified aluminum hydroxide, and wherein the processing agent contains at least one of a silane coupling agent, a titanate-based coupling agent, an aluminate-based coupling agent, and a higher fatty acid processing agent.

2. The battery according to claim 1, wherein
the positive electrode comprises the surface-modified aluminum hydroxide.

3. The battery according to claim 1, further comprising a separator, wherein the separator comprises the surface-modified aluminum hydroxide.

4. A battery pack, comprising:
the battery according to claim 1;
a control unit that controls the battery; and
an exterior that houses the battery.

5. An electronic apparatus, that receives power supply from the battery according to claim 1.

6. An electric vehicle, comprising:
the battery according to claim 1;
a converting apparatus that receives supply of power from the battery and converts the received power into a driving force for the electric vehicle; and
a control apparatus that performs information processing relating to vehicle control on the basis of information on the battery.

7. A power storage apparatus, comprising:
the battery according to claim 1, wherein
the power storage apparatus supplies power to an electronic apparatus connected to the battery.

8. The power storage apparatus according to claim 7, further comprising
a power information control apparatus that transmits/receives a signal to/from another apparatus via a network, wherein
the power storage apparatus controls, on the basis of information received by the power information control apparatus, charge and discharge of the battery.

9. A power system, that receives power supply from the battery according to claim 1.

10. The power system according to claim 9, wherein
power is supplied from a power generation apparatus or a power network to the battery.

11. The battery according to claim 1, wherein the surface-modified aluminum hydroxide is in the form of particles with a $D_{50}$ particle diameter of no less than 1 nm and no more than 5 μm.

12. The battery according to claim 1, wherein the surface-modified aluminum hydroxide has a surface area of no less than 0.5 m$^2$/g and no more than 50 m$^2$/g.

13. The battery according to claim 1, wherein the surface-modified aluminum hydroxide is contained in the electrolyte at a weight percentage of the electrolyte of no less than 1 wt % and no more than 20 wt %.

14. The battery according to claim 1, wherein the processing agent is selected from a group consisting of a vinyl-based silane coupling agent, an epoxy-based silane coupling agent, a styryl-based coupling agent, an iso-cyanate-based coupling agent, a mercapto-based silane coupling agent, an alkoxytitanium, ester, a titanium chelate, a titanium based coupling agent, an aluminate-based coupling agent, a higher fatty acid processing agent, and combinations thereof.

15. The battery according to claim 1, wherein the surface-modified aluminum hydroxide comprises a coating portion containing one or more of the processing agent and a derivative thereof, the coating portion being formed on at least part of the surface of the surface modified aluminum hydroxide.

16. The battery according to claim 1, wherein the surface-modified aluminum hydroxide has two endothermic peaks with a maximum endothermic peak temperature of no less than 270° C. and no more than 360° C. according to differential scanning calorimetry.

17. The battery according to claim 1, wherein the negative electrode comprises a negative electrode active material layer and wherein the surface modified aluminum is contained in the negative electrode active material layer.

18. The battery according to claim 1, wherein the electrolyte is in the form of an electrolyte layer comprising a matrix polymer compound, a non-aqueous electrolyte solution, and the surface-modified aluminum hydroxide.

19. The battery according to claim 18, wherein the electrolyte layer is on a main surface of the positive electrode or on a main surface of the negative electrode.

* * * * *